US007606714B2

(12) United States Patent
Williams et al.

(10) Patent No.: US 7,606,714 B2
(45) Date of Patent: Oct. 20, 2009

(54) NATURAL LANGUAGE CLASSIFICATION WITHIN AN AUTOMATED RESPONSE SYSTEM

(75) Inventors: David R. Williams, Carlisle, MA (US); Jeffrey Hill, Westford, MA (US)

(73) Assignee: Microsoft Corporation, Redmond, WA (US)

( * ) Notice: Subject to any disclaimer, the term of this patent is extended or adjusted under 35 U.S.C. 154(b) by 1049 days.

(21) Appl. No.: 10/939,288

(22) Filed: Sep. 10, 2004

(65) Prior Publication Data

US 2005/0105712 A1 May 19, 2005

Related U.S. Application Data

(63) Continuation-in-part of application No. 10/364,662, filed on Feb. 11, 2003, now abandoned.

(51) Int. Cl.
*G10L 15/22* (2006.01)
(52) U.S. Cl. .................................. 704/275; 379/265.02
(58) Field of Classification Search ................. 704/275; 379/265.02
See application file for complete search history.

(56) References Cited

U.S. PATENT DOCUMENTS

| 5,555,169 | A | 9/1996 | Namba et al. |
| 5,895,466 | A | 4/1999 | Goldberg et al. ............... 707/5 |
| 5,963,940 | A | 10/1999 | Liddy et al. .................... 707/5 |
| 6,182,029 | B1 | 1/2001 | Friedman |
| 6,243,684 | B1 | 6/2001 | Stuart et al. .................. 704/275 |
| 6,377,944 | B1 | 4/2002 | Busey et al. |
| 6,496,799 | B1 | 12/2002 | Pickering |
| 6,604,094 | B1 | 8/2003 | Harris ........................ 706/48 |
| 6,766,316 | B2 | 7/2004 | Caudill et al. |
| 6,778,951 | B1 | 8/2004 | Contractor ..................... 704/9 |
| 6,829,603 | B1 | 12/2004 | Chai et al. |
| 6,915,246 | B2 | 7/2005 | Gusler et al. .................. 703/5 |
| 6,941,266 | B1 | 9/2005 | Gorin et al. ................. 704/257 |
| 7,219,054 | B1 * | 5/2007 | Begeja et al. ............... 704/231 |

(Continued)

FOREIGN PATENT DOCUMENTS

WO   WO 99/53676   10/1999

(Continued)

OTHER PUBLICATIONS

India Patent Application No. 4052/DELNP/2005 First Examination Letter dated Dec. 13, 2007.

(Continued)

*Primary Examiner*—Susan McFadden
(74) *Attorney, Agent, or Firm*—Westman, Champlin & Kelly P.A.

(57) ABSTRACT

An automated response system (e.g., an automated voice response system) may employ learning strategies to develop or improve automated response capabilities. Learning strategies may include using communications (e.g., utterances, text messages, etc.) of one party in a conversation (e.g., a customer service agent) to identify and categorize communications of another party in the conversation (e.g., a caller). Classifiers can be build from the categorized communications. Classifiers can be used to identify common communications patterns of a party in a conversation (e.g., an agent). Learning strategies may also include selecting communications as learning opportunities to improve automated response capabilities based on selection criteria (e.g., selection criteria chosen to ensure that the system does not learn from unreliable or insignificant examples).

17 Claims, 22 Drawing Sheets

U.S. PATENT DOCUMENTS 7,293,013 B1 * 11/2007 Horvitz et al. ................. 707/2
7,305,345 B2 * 12/2007 Bares et al. ................. 704/275
7,487,095 B2 * 2/2009 Hill et al. .................... 704/275

FOREIGN PATENT DOCUMENTS

WO     WO 02/061730     8/2002

OTHER PUBLICATIONS

Third Party Search Submission for U.S. Appl. No. 11/218,925, filed Sep. 2, 2005.
Business Method to Improve Problem Diagnosis in Current Systems Using a Combination of XML and VoiceXML (Author IBM TBD) Jan. 1, 2002.
Knowledge Management-Improvement of Help Desk Operation by Q&A Case Referencing by Seiya and Masaru (Toshiba) from Roshiba Rebyu, 2001, vol. 56, No. 5, p. 28-31.
Practical Issues In The Application of Speech Technology to Network and Customer Service Applications (Author Whittaker, Cahill, Atwater and Geenhow) Interactive Voice Technology for Telecommunications Applications (1998 IEEE $4^{th}$ Workshop. pp. 185-190.
Communication from European Patent Office.
First Chinese Office Action.

* cited by examiner

NATURAL LANGUAGE CLASSIFICATION WITHIN AN AUTOMATED RESPONSE SYSTEM

This application is a continuation-in-part of U.S. application Ser. No. 10/364,662, filed Feb. 11, 2003, now abandoned, the complete disclosure of which is incorporated herein by reference.

BACKGROUND

This description relates to machine learning in an automated response system.

One application in which conversations are managed is in customer contact centers. Customer contact centers, e.g. call centers, have emerged as one of the most important and dynamic areas of the enterprise in the new economy. In today's tough economic environment, cost-effectively serving and retaining customers is of strategic importance. Most companies realize that keeping satisfied customers is less expensive than acquiring new ones. As the enterprise touch point for more than half of all customer interactions, the contact center has become a cornerstone to a successful business strategy.

The growing importance of the contact center is a recent phenomenon. Historically, customer service has been viewed by most organizations as an expensive but necessary cost of doing business, fraught with problems and inefficiencies. High call volumes regularly overwhelm under trained staff, resulting in long busy queues for customers. Inadequate information systems require most callers to repeat basic information several times. Because of this, an estimated twenty percent of shoppers abandon Web sites when faced with having to call an organization's contact center, and many more abandon calls when they encounter holding queues or frustrating menu choices. In addition, customer contact centers represent an extraordinary operating cost, consuming almost ten percent of revenues for the average business. The cost of labor dominates this expense, and the industry's extraordinarily high turnover rate results in the nonstop recruitment and training of new agents.

Unfortunately for business, the goal of ensuring cost-effective customer service is becoming more difficult. The Internet has driven an explosion in communication between organizations and their customers. Customers attach a higher value to service in the Internet economy because products and services purchased online generate a higher number of inquiries than those purchased through traditional sales channels. The contact center's role has expanded to include servicing new audiences, such as business partners, investors and even company employees. New, highly effective advertising and marketing initiatives direct customers to interact with already overburdened contact centers to obtain information. In addition to telephone calls, inquiries are now made over new Web-based text channels—including email, web-mail and chat—that place an enormous strain on customer service operations.

The combination of the growing importance of good customer service and the obstacles to delivering it make up a customer service challenge.

SUMMARY

In one aspect, the invention features using agent communications (e.g., utterances, text messages, etc.) captured in a set of previously recorded agent-caller conversations (e.g., human agent-caller conversations) to train a set of agent classifiers. From the agent classifiers, caller utterances can be located and clustered. The clustered caller utterances can be used to train a set of caller clusters.

In another aspect, the invention features augmenting caller clusters by using classifiers (e.g., agent or caller classifiers) to classify communications in previously recorded agent-caller conversations, adding the classified communications to a training set for an associated classifier, and rebuilding the classifier.

In another aspect, the invention features using agent classifiers to identify common agent request patterns in a set of previously recorded conversations between agents and callers. These common agent request patterns may be associated with certain call types (e.g., calls relating to the same initial caller request). These agent request patterns can be used, e.g., by an application developer, to design a conversation flow of an automated response system.

In another aspect, the invention features using distributions of caller responses to differently phrased agent questions asking for the same information to determine a wording of a question for an automated response system that is most likely to produce the desired response from a caller.

In another aspect, the invention features, a method that includes receiving a set of conversations between a members of a first party type (e.g., human agents or software agents) and a members of a second party type (e.g., human callers), wherein each of the conversations includes a communication of a member of the first party type and a communication (e.g., a spoken request) of a member of the second party type that is responsive to the communication of the member of the first party type (e.g., a spoken response to the request). The method also includes grouping the communications of members of the first party type into a first set of clusters, and then grouping the responsive communications of members of the second party type into a second set of clusters based upon the grouping of the communications of members of the first party type. The method also includes generating, by machine, a set of second party type classifiers (e.g., a support vector machine or decision tree) for one or more clusters in the second set of clusters.

Implementations of this aspect of the invention include one or more of the following features. The method may be used to develop an initial application for an automated response system, such as an automated voice response system or an automated text messaging response system. The communications of members of a first party type may be grouped into a first set of clusters using a computer. For example, a computer process may first determine semantic features of the communications and then group the communications into clusters based on the semantic features.

The groups of communications of members of the first group may be grouped based on the meaning of their communications. In other words, communications may be grouped such that the communications in a group all have the same meaning, but may have different wording. The groups of the communications of members of the second party type into groups corresponding to responses to requests for information from members of the first party type.

The method may further include receiving a second set of set of conversations between a members of first party type and members of a second party type, applying the second party type classifiers to group the communications of members of the second party type, and by machine, regenerating a second party type classifiers for a cluster in the second set of clusters using data relating to the communications grouped in the cluster.

In another aspect the invention features, applying a set of classifiers to categorize initiating communications (e.g., information requests from an agent) that are part of conversations that also include responsive communications and using the categorized communications to identify common communication patterns.

Implementations the invention may include one or more of the following features. The method may further include grouping conversations in the set of conversations by subject matter (e.g., the subject matter of the caller's purpose for calling a call center), and associating identified common communication patterns with the groups.

In another aspect, the invention features applying a set of classifiers (e.g., a support vector machine) to categorize communications of a member of a first party type in a conversations between the members of a first party type and a member of a second party type and determining a subject matter of the conversation based on the combination or sequence of the categorized communications of the member of the first party type.

Implementations of the invention may include one or more of the following features. The method may also include matching the sequence of the categorized communications with a sequence of categorized communications associated with a conversation having a known subject matter.

In another aspect the invention features using examples of communications that occurred between callers and an automated response system (e.g., an automated text messaging response system or an automated voice response system) to improve performance of the system.

In another aspect the invention features selecting examples for learning opportunities for an automated response system based on some selection criteria. The selection criteria can be chosen (e.g., by a user through a graphical user interface) to help ensure that the examples from which the system learns are reliable. The selection criteria can also be chosen to ensure that the system selects only examples that result in a meaningful improvement to the system. By discarding examples that do not result in a meaningful improvement to the system, the system helps to minimize the burden on resources (e.g., processing resources tasked with implementing the improvement or human administrative resources tasked with reviewing or approving learning examples).

In another aspect, the invention features a method for selecting learning opportunities for an automated response system associated with a contact center that includes receiving digital representations of conversations at least some of which comprise a series of communications (e.g., utterances, text messages, etc.) between a person and an agent (e.g., a human agent or software agent) associated with a contact center and selecting a communication as a learning opportunity if one or more selection criteria are satisfied.

Implementations may include one or more of the following features. The selection criteria may be a requirement that a communication be followed by communication exchanges between the person and an agent, a requirement that a communication be followed by a number of successful subsequent communication exchanges between the person and an agent, a requirement that a communication be included within a conversation in which the person responded positively to a satisfaction question posed by an agent, a requirement that a communication in a first conversation be confirmed by similar communications occurring in a number of other conversations, or a requirement that a communication not cause a set of classifiers built using the communication to misclassify communications that a previous set of classifiers had classified correctly.

In some implementations, the communications between the persons and agents may include assist interactions in which a human agent selected a response to a person's communication from a ranked list of proposed responses generated by the automated response system. For these assist interactions, the selection criteria may include a requirement that a selected response in an assist interaction be ranked above a threshold, or a requirement that a selected response in an assist interaction be selected from a trusted human agent.

The selected communications may be used to improve system performance by rebuilding classifiers using the selected communication, generating a language model for an automatic speech recognition engine using the selected communication, or modifying a finite state network using the selected communication.

In voice response implementations, the method may also include performing speech recognition an off-line speech recognition engine on an utterance selected as a learning opportunity. The method may also include, prior to performing the speech recognition, determining whether to perform speech recognition on the selected utterance based on a confidence level of the meaning of the utterance associated with the digital representation of the communication.

In another aspect, the invention features a method for selecting learning opportunities for an automated voice response system associated with a contact center that includes receiving a digital representation of a conversation that took place between a caller and one or more agents associated with the contact center and selecting an utterance captured in the digital representation of the conversation for transcription based on one or more selection criteria.

Implementations may include one or more of the following features. The selection criteria may include a requirement that a confidence level of a response by the automated voice response system be within a range of values or a requirement that a confidence level of a speech recognition process performed on the utterance during the conversation is within a range of values. The method may also include performing speech recognition on the utterance and adding recognized words in the utterance to a vocabulary of words used by a speech recognition process used by the system to recognize utterances during conversations.

In another aspect, the invention features a method that includes, based on an interaction between a person and a human agent associated with an automated response system in which the agent selected a response to a communication of the person from among responses proposed by the automated response system, selecting the communication as an example to train the automated response system.

Implementations of the invention may include one or more of the following features. Selection of a communication may be based on a confidence level of the response selected by the agent or on a level of trust of a human agent who selected the response.

In another aspect, the invention features a method identifying a communication between a person contacting an automated response system that resulted in the response being handled by a human agent and modifying the automated response system to respond to similar future communications from persons contacting the system.

In one particular implementation, modifying the automated response system may comprise modifying a finite state transition network associated with the system.

In another aspect the invention features a method for selecting learning opportunities for an automated response system that includes adding a communication to a set of training example for a classifier in a concept recognition engine, generating a new classifier using the set of training examples that includes the added communication, and disregarding the new classifier based on the performance requirement for a new classifier.

Implementations may include one or more of the following features. The performance requirement may be a requirement that a new classifier correctly classify at least a predetermined number of other examples or a requirement that a new classifier have a new definitive set of examples that is different from the definitive set of examples of the previous classifier by a predetermined amount.

In another aspect the invention features generating a set of classifiers for at least one cluster of responsive communications, the cluster being based on one or more clusters of initiating communications with which the responsive communications are associated within conversations.

Implementations may include one or more of the following features. The initiating conversations may be from a member of a first party type (e.g., an agent at a customer service center) and the responsive conversations may be from a member of a second party type (e.g., a customer contacting a customer service center). The method may also include receiving a set of conversations at least some of which include an initiating communication and an associated responsive communications. The cluster of response communications may comprise responsive communications associated with an initiating communication.

Other advantages, features, and implementations will be apparent from the following description, and from the claims.

DESCRIPTION

Natural language processing technology based on concepts or meaning, such as the technology described in U.S. Pat. No. 6,401,061, incorporated by reference in its entirety, can be leveraged to intelligently interact with information based on the information's meaning, or semantic context, rather than on its literal wording. A system can then be built for managing communications, for example, communications in which a user poses a question, and the system provides a reply. Such a system is highly effective, user-friendly, and fault-tolerant because it automatically extracts the key concepts from the user query independently of the literal wording. The concept recognition engine (of the kind described in U.S. Pat. No. 6,401,061) enables the formation of appropriate responses based on what customers are asking for when they engage the underlying system in conversation over voice or text-based communication channels. The conversation may be a synchronous communication with the customer (such as a real-time dialog using voice or instant messaging or other communication via a web page) or asynchronous communication (such as email or voice mail messages). In conversations using asynchronous communication mode, responses are provided at a later time relative to the customer's inquiries.

In the example of a customer contact center, prior to run-time, the communication management system creates a knowledge base using logged actual conversations between customers and human agents at a customer contact center. Using logged conversations in this manner instead of trying to program the system for every possible customer interaction makes set up simple, rapid, and within the ability of a wide range of system administrators.

Unlike traditional self-service systems that are incapable of quickly adapting to ever-changing business conditions, the system described here can rapidly model typical question and answer pairs and automate future conversations.

Figure 1:
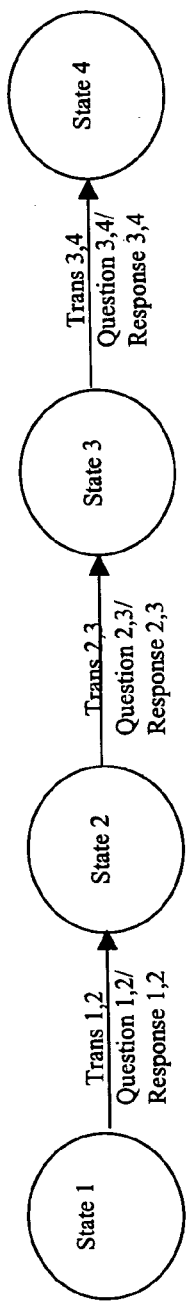
FIG. 1 shows a state transition line diagram and FIG. 1A shows a state transition graph.

Each conversation that is processed by the system (either to build the knowledge base prior to run-time, or to process live communications at run-time) is modeled as an ordered set of states and transitions to other states in which the transition from each state includes a question or statement by the customer and a response by the human agent (or in some cases, an action to be taken in response to the question, such as posing a question back to the user). A symbolic state-transition-state sequence for a conversation that is being processed from a recorded interaction is illustrated in FIG. 1. In some implementations, the delimiter for each statement or communication by the customer or response by the human agent is a period of silence or a spoken interruption.

Figure 1A:
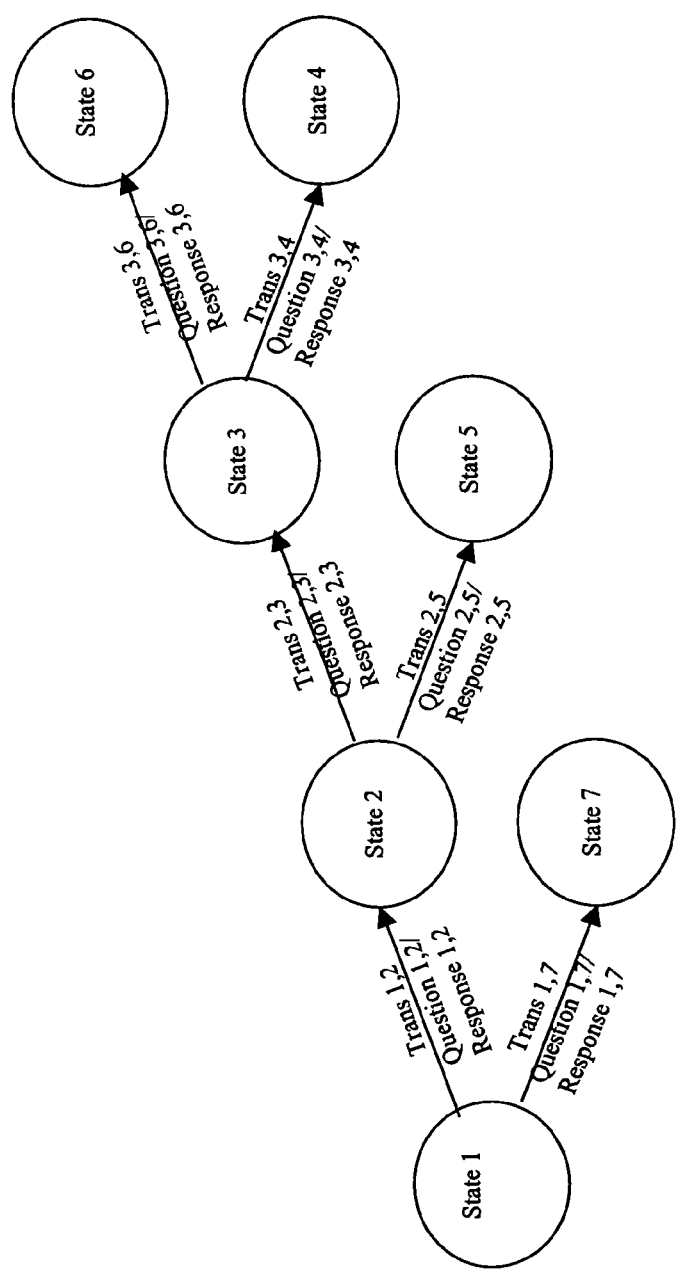

The text for each of these statements or responses is extracted from whatever communication medium was used in the conversation, for example, text or speech. For example, an on-line automatic speech recognition (ASR) engine may be used to convert spoken conversation into text. Next, the system extracts key concepts from the customer's question or statement or the human agent's response. This extraction is done as described in U.S. Pat. No. 6,401,061 by creating a library of text elements (S-Morphs) and their meaning in terms of a set of concepts (semantic factors) as a knowledge base for use by a concept recognition engine. The concept recognition engine parses the text from the customer or agent into these S-Morphs and then concepts matching these S-Morphs are collected. These key concepts for a communication (question or response, in the example being discussed) can be stored as a non-ordered set and can be referred to as a "bag of concepts". Higher level organizations of the concepts into various structures reflecting syntax or nearness is also possible. After the entire set of logged conversations (i.e., dialogs) is processed, each conversation is expressed as a state-transition-state sequence. The system accumulates all of the conversation state transition sequences into a single graph so that the initial state may transition to any of the conversations. This aggregate transition graph is then compressed using graph theory techniques that replace duplicate states and transitions. The system recursively determines which transitions from a given state are duplicated, by comparing the transitions to their "concepts". Successor states of duplicate transitions from the same state are then merged into one state with all of the transitions from the successor states. The text of one of the responses of the duplicate transitions is preserved in the knowledge base as a standard response. This text can be passed back to the customer as part of a conversational exchange in the form of text or converted into voice. The resulting compressed state transition graph forms the knowledge base for the system. An example of a compressed state transition graph is illustrated in FIG. 1A. In some implementations, all of the information in this knowledge base is stored using a well-defined XML grammar. Examples of mark-up languages include Hyper Text Markup Language (HTML) and Voice Extensible Markup Language (VoiceXML). In this case, a Conversation Markup Language (CML) is used to store the information for the knowledge base.

Figure 2:
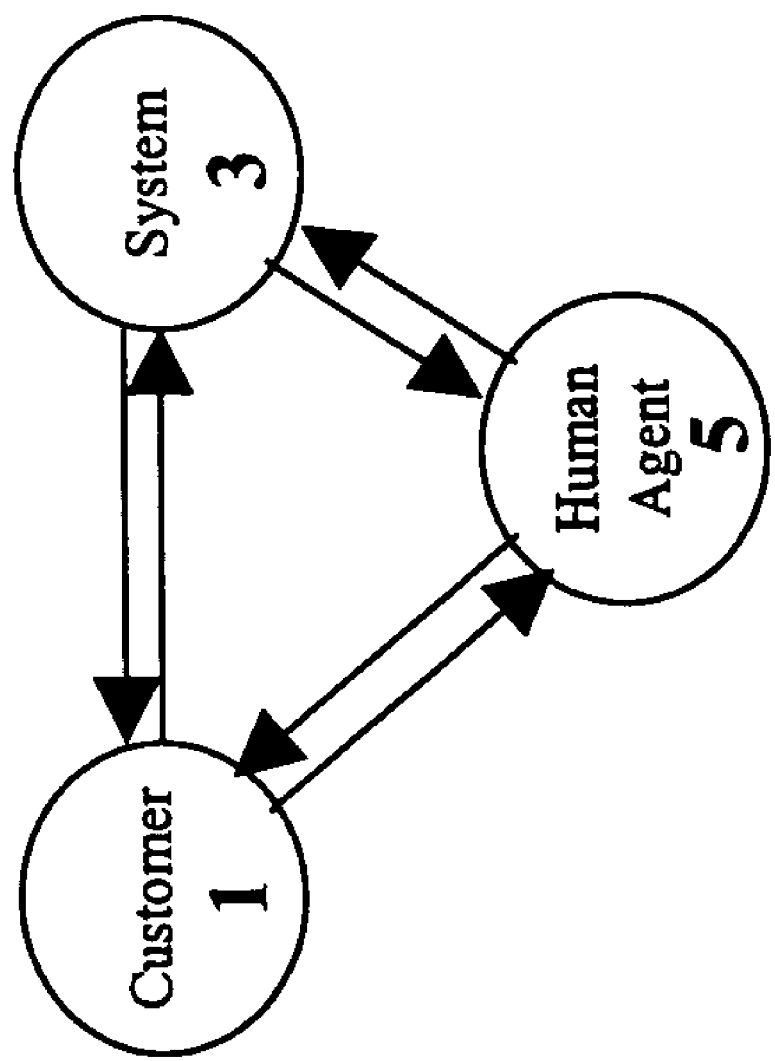
FIG. 2 shows interactions between the customer, the system, and the human agent.

Once the knowledge base has been formed, the system may proceed to an operational (run-time) mode in which it is used to manage communications in, for example, a customer contact center. The logs that were used to build the knowledge base for a given customer contact center would, in some implementations, be recorded from conversations occurring at that same customer contact center or one that is characterized by similar kinds of conversations. Using the knowledge base, the system can keep track of the current state of run-time conversations based on the state transition graph for the customer contact center. For example, after a customer makes his first communication (converted into text) with the customer contact center (for example, the user might make an arbitrary natural language spoken query), the system uses the concept recognition engine to extract the concepts from the text. Next, the system attempts to match the concepts from the text with the transitions from the initial state in the contact center's state transition graph. This matching is done by comparing the set of concepts associated with the current communication with sets of concepts stored in the knowledge base. The closer the two sets are, the more confidence there is in the accuracy of the match. If the best matching transition in the knowledge base matches the customer's text with a confidence above some threshold, then the system assumes that it has identified the correct transition, locates the corresponding response in the knowledge base, and communicates that corresponding response to the customer. The system proceeds to the next state in the state transition graph and waits for the customer's next communication. This traversal of a sequence of states and transitions may continue until either the customer terminates the conversation or the state transition graph reaches an end state. However, errors in the text received by the concept recognition engine and non-standard (or unexpected) questions or statements by the customer may require intervention by a human agent. When the customer's communication is in the form of speech, the conversion from speech to text may have such errors. Due to the possibility of such errors, in some implementations, the system does not rely on complete automation of the responses to the customer but has a smooth transition to manual intervention by the human agent when the automation is unsuccessful. In general, this type of gradual automation is suggested by FIG. 2 that shows interactions between the customer 1, the system 3, and the human agent 5. (In other implementations of the system, automated responses may be given in cases of high confidence, while no response (other than to indicate that the system is unable to respond) is given to the user.) In some examples, the system uses speech recognition technology to engage customers in conversations over the telephone. The speech recognition technology converts the customer's speech into text that becomes input to the concept recognition engine. By integrating the concept recognition engine with speech recognition, the underlying system recognizes what the customer says by conceptually understanding what the customer means. This combination enables new levels of automation in the customer service center by engaging users in intuitive, intelligent, and constructive interaction across multiple channels. And that enables organizations to offload significant volumes of routine customer transactions across all contact channels, saving considerable expense and improving service levels.

In other implementations, these conversations with the customer may occur over audio interfaces using, for example, a VoiceXML browser, the web using an HTML browser, Instant Messenger using an IM application, email using a mail application as well as other channels not yet in use.

It should be noted that this system enables the contact center's response to use a different mode of communication than the customer's communication. For instance, the customer may communicate using voice and the contact center may respond with text or the customer may communicate using text and the contact center may respond with computer generated voice. This is accomplished by either using the saved response text directly or by converting the saved response text into computer generated speech.

In some implementations, the system provides three types or levels of conversation management and the system may switch between these during a given conversation.

1. Automated—The system is able to produce appropriate responses to the customer's requests and automate the transaction completely independently of a human agent. For example, customer A calls a company's customer contact center to inquire about their warranties on new products. Customer A is greeted by an automated system that introduces itself and gives a brief explanation of how the automated system works, including sample inquiries. He is then prompted to state his inquiry in his own words. Customer A states his inquiry in a conversational manner. The automated system informs the customer of the company's comprehensive warranty policy. The system asks customer A if the resolution was helpful and whether he has any additional questions. His question answered, customer A finishes the call.

2. Blended Agent Assist—In this mode, the system involves a human agent by presenting him with the customer inquiry and a number of suggested responses ranked by confidence/similarity ("match score"). The human agent selects one of the suggested responses, enabling the system to complete the call. The human agent can also search the system knowledge base for an alternative response by entering a question into the system. In the blended agent assist mode, the agent does not pick up the call or interact directly with the customer. The blended model is expected to reduce agent time on a call by enabling him to quickly 'direct' the system to the correct resolution. The human agent can then move on to a new transaction. For example, customer B calls a company's customer service organization to ask for an address where he can overnight payment for services. Customer B is greeted with an automated system that introduces itself and confirms the customer's name. After confirming his name, customer B is given a brief explanation of how the automated system works, including sample inquiries. He is then prompted to state his inquiry in his own words. Customer B states his inquiry in a conversational manner. The automated system asks the customer to please wait momentarily while it finds an answer to his question. The system places a call to the next available agent. While the customer is waiting, the system connects to an available human agent and plays a whisper of customer B's question. The human agent receives a screen pop with several suggested responses to the customer's question. The human agent selects an appropriate suggested answer and hits 'respond,' enabling the system to complete the interaction. The system resumes its interaction with customer B by providing an overnight address. The system asks customer B if the resolution was helpful and whether he has any additional questions. His question answered, customer B finishes the call without knowing that a human agent selected any of the responses.

3. Agent Assist Takeover.—In the takeover model, the system escalates to a human agent and the human agent takes over the call completely, engaging the caller in direct conversation. The takeover model is expected to improve agent productivity by pre-collecting conversational information from the call for the customer service agent and enabling the agent to look up information in the system's knowledge base during the call, reducing the amount of time then needed to spend on a call. For example, customer C calls a company's customer service organization to close his account. Customer C is greeted with an automated system that introduces itself and confirms the customer's name. After confirming his name, Customer C is given a brief explanation of how the automated system works, including sample inquiries. He is then prompted to state his inquiry in his own words. Customer C states that he would like to close his account with the company. The automated system asks the customer to confirm his account number. Customer C punches in his account number on the telephone keypad. The system tells Customer C to please hold on while he is transferred to an agent. The system passes the call to the appropriate agent pool for this transaction. The next available agent receives a recording of customer C's question and receives a screen pop with his account information. The agent takes over the call by asking when customer C would like to close his account.

The system switches among the three modes of conversation management based on the ability of the system to handle the situation. For instance, in automated conversation mode, if the system is unable to match the customer's inquiry with a standard question/response pair with sufficient confidence, then the system may switch to the blended agent assist mode. Furthermore, in a blended agent assist mode, if the human agent determines that none of the computer generated responses are appropriate given the customer's inquiry, then the system may switch to the agent assist takeover conversation mode and the human agent finishes up the conversation. In a preferred embodiment of this invention, the customer also has the capability to switch modes of conversation. For instance, the customer may wish to switch out of automated conversation mode. In another embodiment, the system may adjust the threshold of confidence in interpreting the customer's communication based on how busy the human agents are. This may give customers the option to try automated responses rather than waiting on busy human agents.

An additional mode of conversation management occurs when the human agent has sufficient experience with the communication patterns of the system. In this case, if the customer's communication is matched with transitions with a low level of confidence, the human agent may decide to rephrase the customer's question with substitute text that may result in a more successful match. If so, then the conversation may continue in the automated mode.

Figure 3:
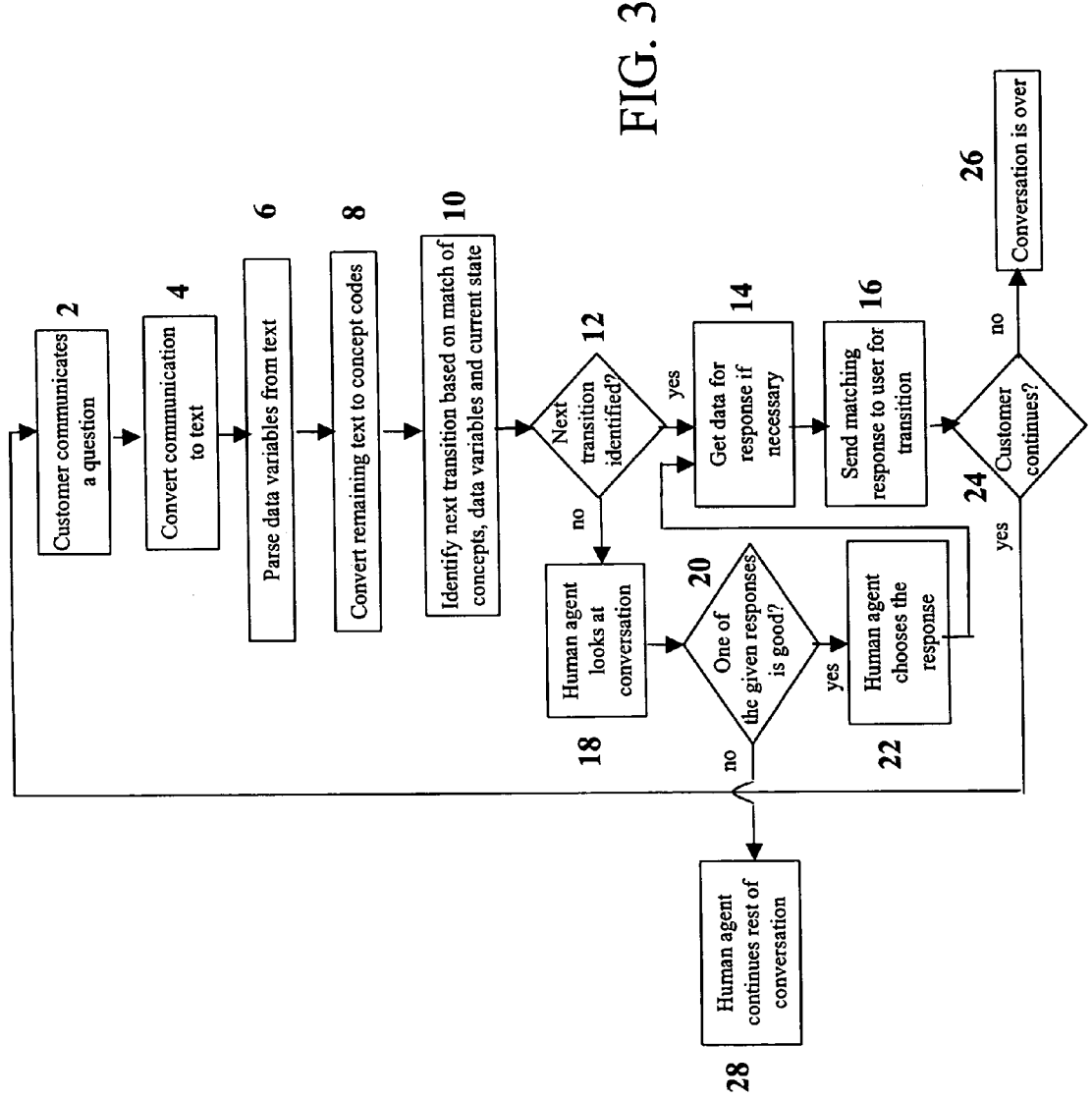
FIG. 3 is a flowchart.

Conversations between a customer and a contact center that are managed by the system using these three modes of conversation are modeled by the flowchart illustrated in FIG. 3. In this flow, first a user initiates a conversation by communicating a question or statement to the contact center (2). Next, the communication is converted into text (4). The identified transition may contain variable data that is pertinent to the subsequent response by the system. The variable data may be the customer's name or identifying number and has a specific data type {string, number, date, etc.}. The variable data (when present) is extracted from the text of the customer's communication (6). Special rules may be used to identify the variable data. Next, the concept recognition engine parses the remaining text into S-morphs and collects a "bag of concepts" matching these S-morphs (8). Next, the system identifies the transition from the current state whose concepts matches the extracted concepts from the customer's communication with the highest level of confidence (10). If data variables are expected in the transition, then matching the data type of the expected variables with the data type of extracted variables is included in the comparison. If the confidence of the match is higher than a set threshold (12), then the system assumes that the customer is on the identified transition. In this case, the system may have to look up data for the response matching the identified transition (14). For instance, if the customer's communication is a question asking about operating hours of a business, then the system may look up the operating hours in a database. Next, the system sends the matching response to the user with the extra data if it is part of the response (16). This response may be one of many forms of communication. If the conversation is over a phone, then the system's response may be computer-generated speech. If the conversation is text-based, then the response may be text. Of the response may be in text even though the question is in speech, or vice versa. If the system identifies a transition with insufficient confidence (12), then a human agent at the contact center is prompted for assistance. The human agent views a graphical user interface with a presentation of the conversation so far (18). The system also shows the human agent a list of expected transitions from the current state ranked in order from the transition with the best match with the customer's communication to the worst match. The human agent determines if one of the expected transitions is appropriate for the context of the conversation (20). If one transition is appropriate, then the human agent indicates the transition to the system and the system continues the conversation in the automated mode (14). Otherwise, if the human agent determines that no transition is appropriate for the context of the conversation, then the human agent directly takes over the conversation until its completion (28).

The system may continue expanding its knowledge base while in operational (run-time) mode. The system logs conversations between the human agent and the customer when the system is in the agent assist takeover mode. At regular intervals, these conversations are processed as in the initial creation of the knowledge base and the new state transition sequences are added to the knowledge base. One difference is that the agent assist takeover mode typically begins at a state after the initial state. Thus, one of the new state transition sequences typically is added to the aggregate state transition graph as a transition from a non-initial state. Every time a new state transition sequence is added to the aggregate state transition graph in the knowledge base, the aggregate state transition graph is compressed as described previously.

Figure 4:
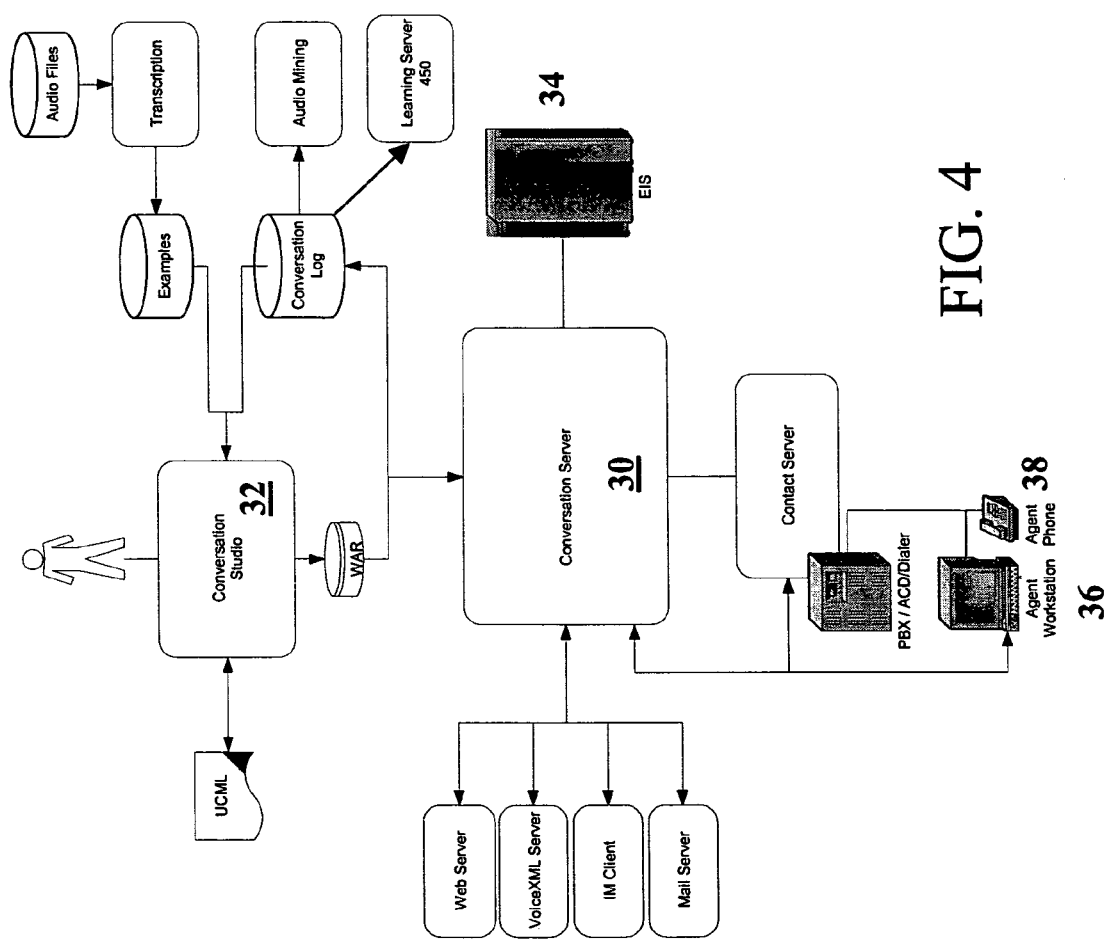
FIG. 4 is an overview of a software architecture system.

An example implementation of the system is illustrated in FIG. 4. The conversation server 30 is the run-time engine of the system. The conversation server 30 is a Java 2 Enterprise Edition (J2EE) application deployed on a J2EE application server. This application is developed and deployed to the conversation server using the conversation studio 32. FIG. 4 shows the relationship between the conversation server 30 and the conversation studio 32.

The system is a multi-channel conversational application. Within the conversation server 30, sets of automated software agents execute the system application. By multi-channel, we mean, for example, that the software agents are capable of interacting with callers over multiple channels of interaction: telephones, web, Instant Messaging, and email. By conversational, we mean that the software agents have interactive conversations with callers similar to the conversations that human agents have with callers. The system uses an iterative application development and execution paradigm. As explained earlier, the caller and agent dialogs that support the system application are based on actual dialogs between callers and human customer support agents within the contact center.

FIG. 4 also shows the relationship between the conversation server and other elements of the system. The conversation server 30 interacts with an enterprise information server (34) that accepts data originating from customers and provides data for responses to customer questions. The agent workstation 36 executes software with a graphical user interface that allows a human agent to select transitions for the system when a conversation is in the blended agent assist mode. The agent phone 38 enables the human agent to enter into a live oral conversation with a customer when the conversation is in the agent assist takeover mode.

The system also includes a learning server 31 that implements processes to help the system learn from calls after the system is deployed. The learning server 31 is described in more detail below with respect to FIG. 17.

Figure 5:
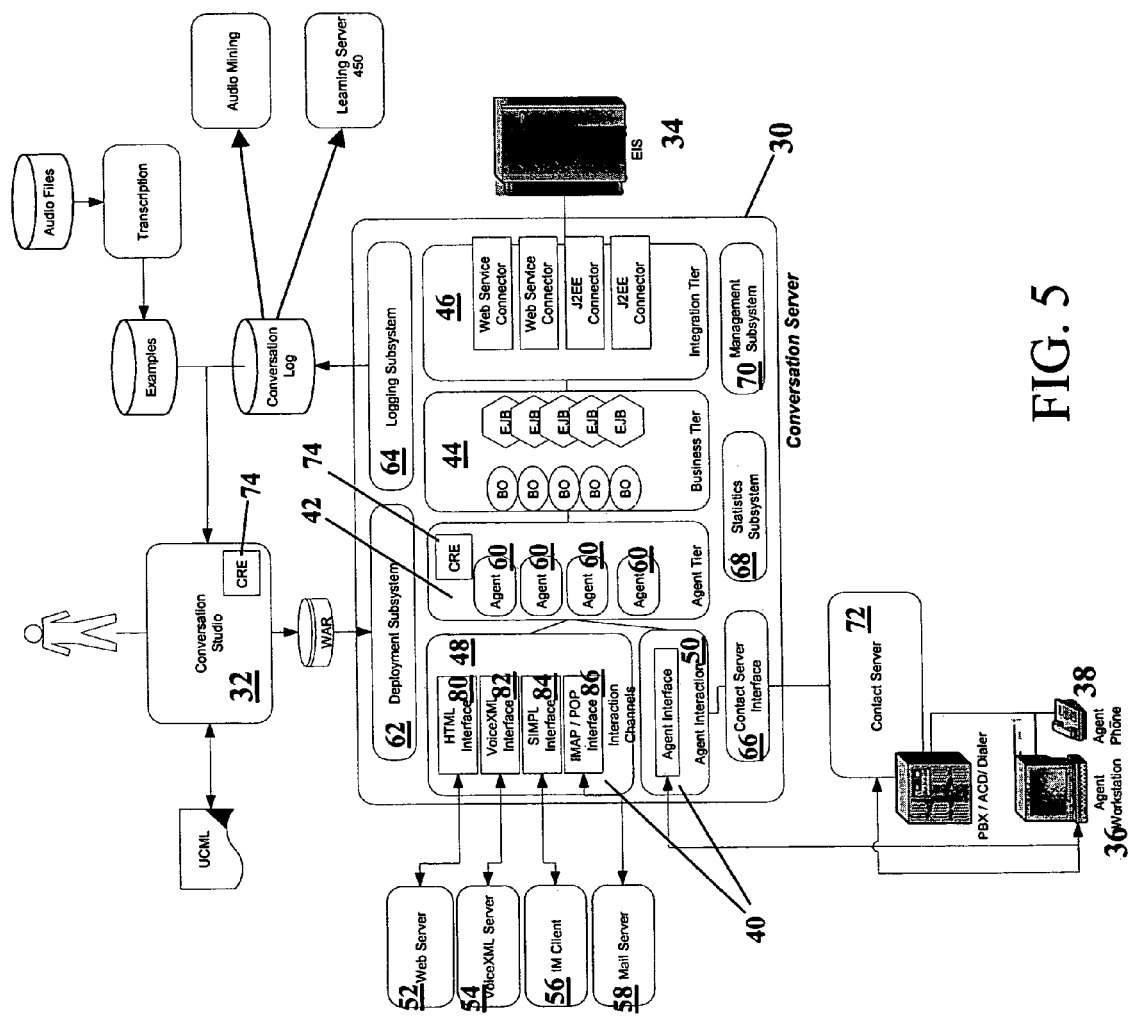
FIG. 5 is more detailed view of the software architecture of FIG. 4.

The conversation server 30's internal architecture is depicted in FIG. 5. The conversation server 30 has a core set of four tiers that support the logic of the system application. These tiers are the four tiers that are traditionally found in web application servers. They are presentation 40, workflow 42, business 44, and integration 46.

The presentation tier 40 is responsible for presenting information to end-users. Servlets such as Java Server Pages (JSPs) are the J2EE technologies traditionally employed in this tier. The presentation tier is composed of two subsystems: the interaction channel subsystem 48 and the agent interaction subsystem 50. The interaction channel subsystem 48 handles the conversation server's 30 interaction with customers over each of the channels of interaction: web 52, VoiceXML 54, Instant Messenger chat 56, and email 58. The agent interaction subsystem handles the conversation server's 30 interaction with the human agents within the contact center.

The workflow tier 42 handles the sequencing of actions. These actions include transaction against the business objects within the business tier and interactions with end-users. In the conversation server 30, the workflow tier 42 is populated by software agents 60 that understand the conversations being held with customers. In addition, these agents interact with the business objects within the business tier 44. The software agents 60 are the interpreters of the markup language produced by the conversation studio 32 (the application development system).

The business tier 44 holds the business objects for the application domain. Enterprise Java Beans (EJBs) are the technology traditionally employed in the business tier. The conversation server does not introduce system-specific technology into this tier. Rather, it employs the same set of components available to other applications deployed on the J2EE application server.

The integration tier 46 is responsible for the application server's interface to databases and external systems. J2EE Connectors and Web Services are the traditional technologies employed in this tier. Like the business tier 44, the conversation server 30 does not introduce system-specific technology into this tier. Rather, it employs the traditional J2EE components. The value of a common integration tier is that any work to integrate external systems is available to other applications deployed on the J2EE server.

Surrounding the core set of four tiers is a set of subsystems that facilitate the operations of the conversation server 30. These subsystems are deployment 62, logging 64, contact server interface 66, statistics 68, and management 70.

The deployment subsystem supports the iterative, hot deployment of system applications. This fits within the iterative application development where conversations are logged and fed back to the conversation studio 32 where personnel within the contact center may augment the application with phrases the system application did not understand.

The logging subsystem 64 maintains a log of the conversations that software agents 60 have with customers and customer support agents. This log is the input to the iterative application development process supported by the conversation studio 32. The learning server 31 uses these logged calls to generate a set of learning opportunities for the concept recognition engine (CRE) 74.

The contact server interface (CTI) 66 provides a unified interface to a number of CTI and contact servers 72.

The statistics subsystem 68 maintains call-handling statistics for the human agents. These statistics are equivalent to the statistics provided by ACD and/or contact servers 72. Call center operations folks may use these statistics to ensure that the center has a sufficient workforce of human agents to serve the traffic the center is anticipating.

The management subsystem 70 allows the conversation server 30 to be managed by network management personnel within the enterprise. The subsystem 70 supports a standard network management protocol such as SNMP so that the conversation server 30 may be managed by network management systems such as HP OpenView.

Figure 6:
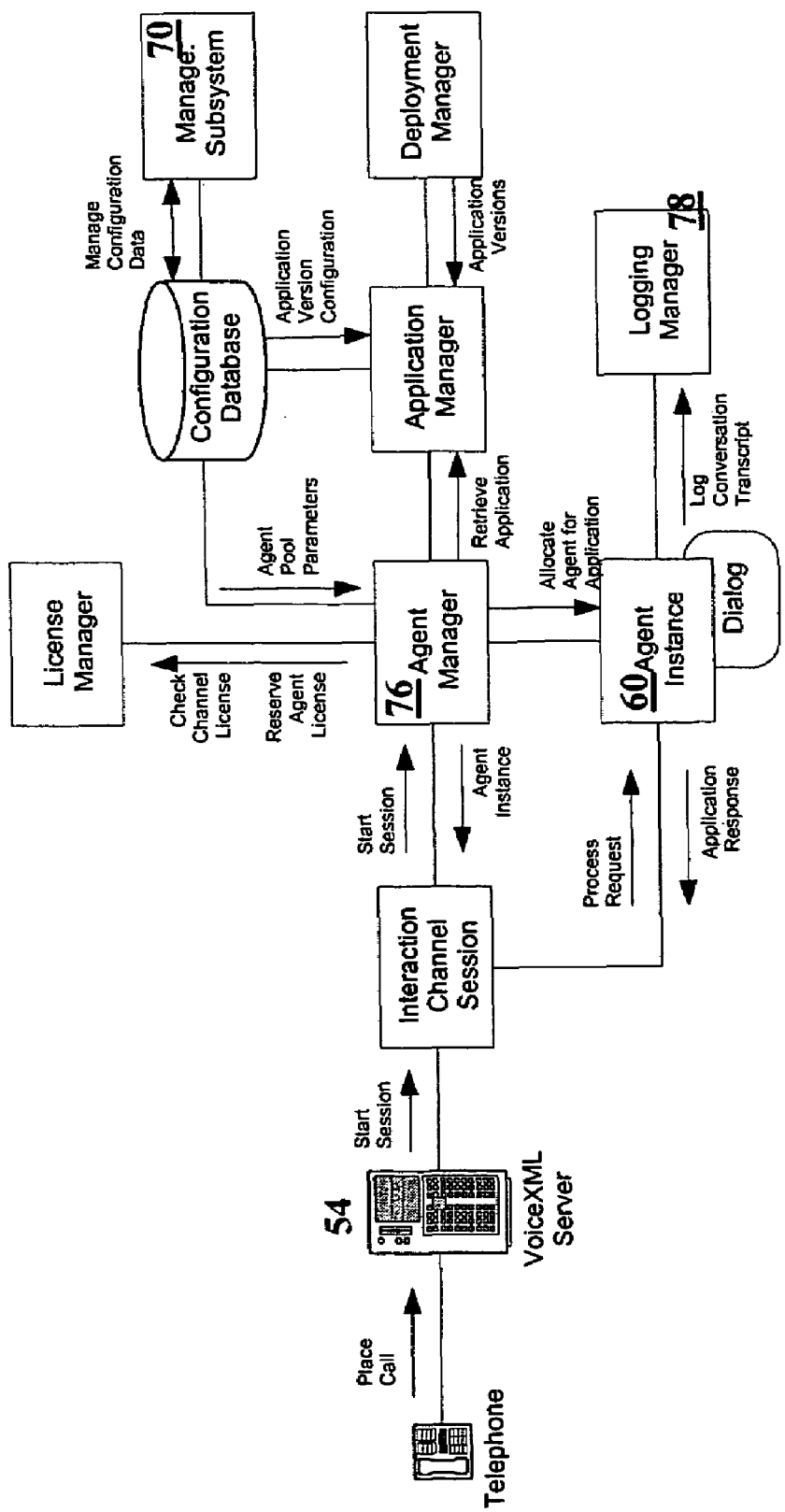
FIG. 6 is a block diagram of workflow components system.

FIG. 6 shows the components of the workflow tier 40 of the system. software agents 60 are the primary entity within the workflow tier 40. software agents 60 are the automated entities that hold conversations with customers, human agents within the contact center, and the back-end systems. All of these conversations are held according to the applications developed and deployed by the conversation studio 32. The functional requirements on the workflow tier 40 are:

Allocate, pool, and make available software agents capable of handling any of the applications deployed to the conversation server 30. This agent pooling capability is similar to the instance pooling capability of EJBs. It also fits within the workforce management model of contact centers.

The interaction channel allocates a software agent 60 and requests that the software agent 60 handle a particular application. The workflow tier 40 interacts with an application manager that manages the applications. The application manager will select the version of the application to employ (as instructed by the application developer).

The software agent 60 checks with the license manager to ensure that interactions are allowed over the requesting channel. If not, the software agent 60 returns an appropriate response.

Software agents are capable of holding multiple dialogs at once. Software agents may hold a conversation with at least one customer while conversing with a human agent during resolution of a response. This capability may be extended to have agents talking to customers over multiple channels at once.

Software agents 60 hold the conversation according to the application developed in the conversation studio 32.

Software agents 60 call the concept recognition engine (CRE) 74 to interpret the customer's input in the context that it was received and act upon the results returned.

Each software agent 60 maintains a transcript of the conversation it is having. This transcript is ultimately logged via the conversation logging subsystem. The transcript contains the following information all appropriately time stamped:

The application being run
The path through the dialog with the customer including:
  The customer input as both recognized text as well as the spoken phrase.
  The state of the dialog (context, transitions, etc.)
  The results of meaning recognition
  The actions the software agent takes based on the meaning recognition results.
  The output sent to the customer.

One of the actions the software agent 60 may take is to request the assistance of a human agent. This will result in a sub transcript for the dialog with the human agent. This transcript contains:

Queue statistics for the agent group at the beginning of the call
When the call was placed and picked up
A sub-transcript of the agent's actions with the call including:
  Whether the agent assists or takes over
  Actions the agent takes in assisting; for example, selecting from the list of responses presented by the software agent 60, adjusting the query and searching the knowledge base, creating a custom response.
  Whether the agent marks a particular response for review and the notes the agent places on the response.
  The agent's instructions to the software agent 60.

The workflow tier 42 will produce the statistics for the pool(s) of software agents 60. These statistics will be published via the statistics subsystem 68.

The operating parameters governing the workflow tier 42 (e.g., minimum and maximum agents/application, growth increments) will be retrieved from the configuration database managed via the management subsystem 70.

FIG. 6 shows the components that make up the workflow tier 42—the agent manager 76 and the agent instance. The agent manager 76 handles the pooling of agent instances and the allocation of those instances for particular application. The agent manager 76 is responsible for interacting with the other managers/subsystems that make up the conversation server 32 (not shown is the agent manager's 76 interaction with the Statistics subsystem 68). Each agent instance 60 logs a conversation transcript with the Logging Manager 78.

The presentation tier consists of two subsystems: the interaction channels 48 and the agent interaction subsystem 50.

Figure 7:
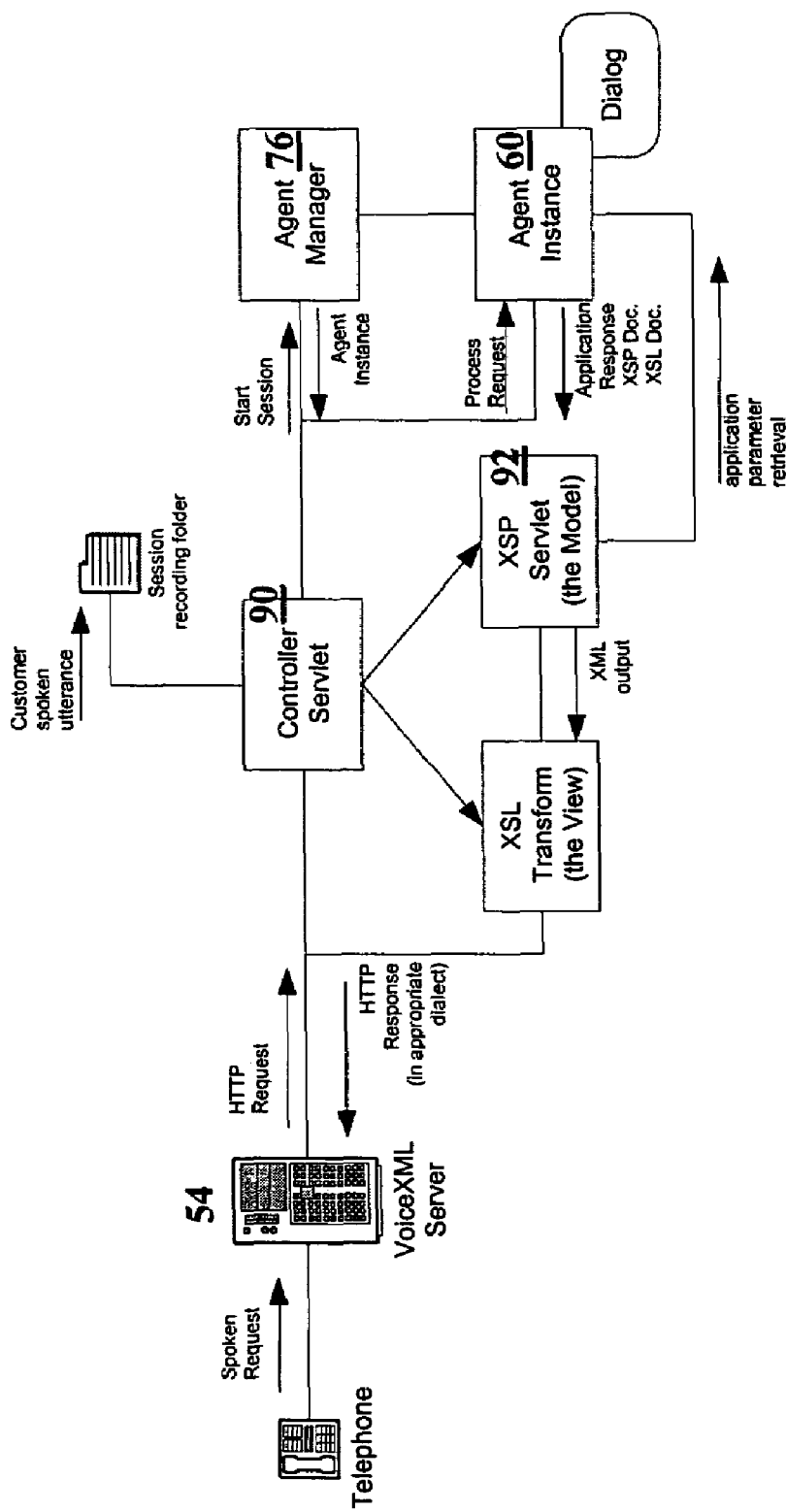
FIG. 7 is a block diagram of interaction channel components.

There is an interaction channel associated with each of the modes of interactions supported by the conversation server: HTML 80, VoiceXML 82, Instant Messenger 84, and email 86. The interaction channel subsystem 48 is built upon the Cocoon XSP processing infrastructure. The interaction channel 48 processing is depicted in FIG. 7. The functional requirements of the interaction channels are:

Initiate, maintain, and terminate an interaction session for each conversation with a customer (end-user). As part of that session, the interaction channel will hold the agent instance that manages the state of the dialog with the customer.

Determine the channel type and application from the incoming Uniform Resource Locator (URL). The URL may take the form of http://host address/application name.mime type?parameters where host address=IP address and port; application name=deployed name of the application; MIME type=indicates channel type (e.g., html, vxml, etc.); parameters=request parameters.

For HTML and VoiceXML channels, to pass the HTTP request to the agent for processing. For the IM and email channel, to perform an equivalent request processing step.

To translate the channel-independent response to a channel-specific response using the appropriate document definition language (HTML, VoiceXML, SIMPL, SMTP, etc.). This translation is governed by XSL style-sheets. The definition of responses and processing style-sheets is part of the application definition and returned by the agent in reply to each request processing invocation.

The definition of responses and XSL style-sheets fall into three use cases. The interaction channel is not particularly aware of these use cases.

The response document and the XSL style-sheet are defined at a channel basis for the application. The response document requests the contents of the CML <output> tag as well as other artifacts generated from the CML (e.g., grammar file).

In the "file" use case, the user defines the response document within the application. The response document is processed using the XSL style-sheet defined at the channel. The response document must adhere to the DTD that governs response documents. This DTD allows for multi-field forms to be defined.

In the "open" use case, the user defines the response document as well as the XSL style sheet. No restrictions are placed on either document and the conversation server 30 is not responsible for any results with respect to the processing of the response.

This translation handles both the transformation to the channel-specific document language and the branding of a response for a particular client.

For the VoiceXML channel 54, the interaction channel 82 is responsible for logging the recorded customer request and informing the agent of the location of the recording for inclusion in the conversation log and/or passing in the whisper to a human agent.

As stated previously, the interaction channel subsystem 48 is implemented using the Cocoon infrastructure. The Cocoon infrastructure provides a model-view-controller paradigm in the presentation tier 40 of a web application server infrastructure.

A servlet 90 (the controller) handles the HTTP requests and interacts with the agent instance 60 to process the request. The agent instance 60 returns the response XSP document and the XSL style-sheet to apply to the output of the document.

The XSP document (the model) is compiled and executed as a servlet 92. The document requests parameters from the agent instance to produce its output—an XML stream. An XSP document is the equivalent of a JSP document. Like JSP processing, XSP compilation only occurs if the XSP document has changed since the last time it was compiled.

The XML stream is transformed according to the XSL style-sheet (the View) to the language specific to the interaction channel (e.g., HTML, VXML).

The human agent interaction subsystem (AIS) is responsible for establishing a dialog with a human agent within the contact center and managing the collaboration between the software agent and human agent to resolve a response that is uncertain. The subsystem is also used when a transfer of an application is requested in an application. The agent interaction subsystem interacts with the CTI Server Interface to execute the connection within the contact center. The CTI Server Interface also provides the agent interaction subsystem with queue statistics that may alter its behavior with respect to the connection to the agent group.

The agent interaction subsystem (AIS) does the following actions:

- Initiate, maintain, and terminate a dialog with a human agent within the contact center to resolve a response that is in question. The human agent is a member of a specified agent group designated to handle resolutions for this particular application.
- As part of initiating a dialog with an agent, the AIS allocates and passes a handle to the agent session that allows the human agent's desktop application to collaborate in the resolution of the response.
- The AIS provides an application programming interface (API) through which the human agent's desktop application is able to retrieve the following: the customer request and suggested responses currently requiring resolution; the threshold settings that led to the resolution request and whether the resolution request is due to too many good responses or too few good responses; the customer's interaction channel type; the transcript of the conversation to date; the current state of the workflow associated with this customer conversation, for example, the number of times that human agents have assisted in this conversation, the length of time the customer has been talking to a software agent, the state (context) that the customer is in with respect to the conversation and potentially, some measure of progress based on the state and time of the conversation; and the current application (and network) properties.
- The AIS API also allows the human agent to: select the response to return to the customer, modify the request and search the MRE database, and potentially select the response to return to the customer, take over the call from the software agent; and mark a request/response interaction for review in the conversation log and associate a note with the interaction.
- The AIS API also exposes the JTAPI interface to allow the human agent to log into/out of the contact server 72 and manage their work state with respect to the contact center queues.
- The AIS API employs a language-independent format that allows it to be accessed from a number of implementation technologies.
- The AIS supports the routing of voice calls from the VoiceXML server 54 to the contact center and the subsequent association of those voice calls with a particular agent session.
- The AIS allows an application designer to define the presentation of application data to the human agent. This presentation should use the same XSL processing employed in the interaction channel (82, 84, 86, or 88).

Part of the human agent interaction subsystem is an agent desktop application that allows the contact center agent to handle a resolution call. This application takes two forms:

- Generic Human Agent Desktop. This desktop operates in non-integrated Customer Relations Management (CRM) environment and runs as a separate process on the agent's desktop connected to the CTI and CS server.
- CRM Component. This desktop is packaged as a component (ActiveX component or Applet) that runs within the context of a CRM package.

Figure 8:
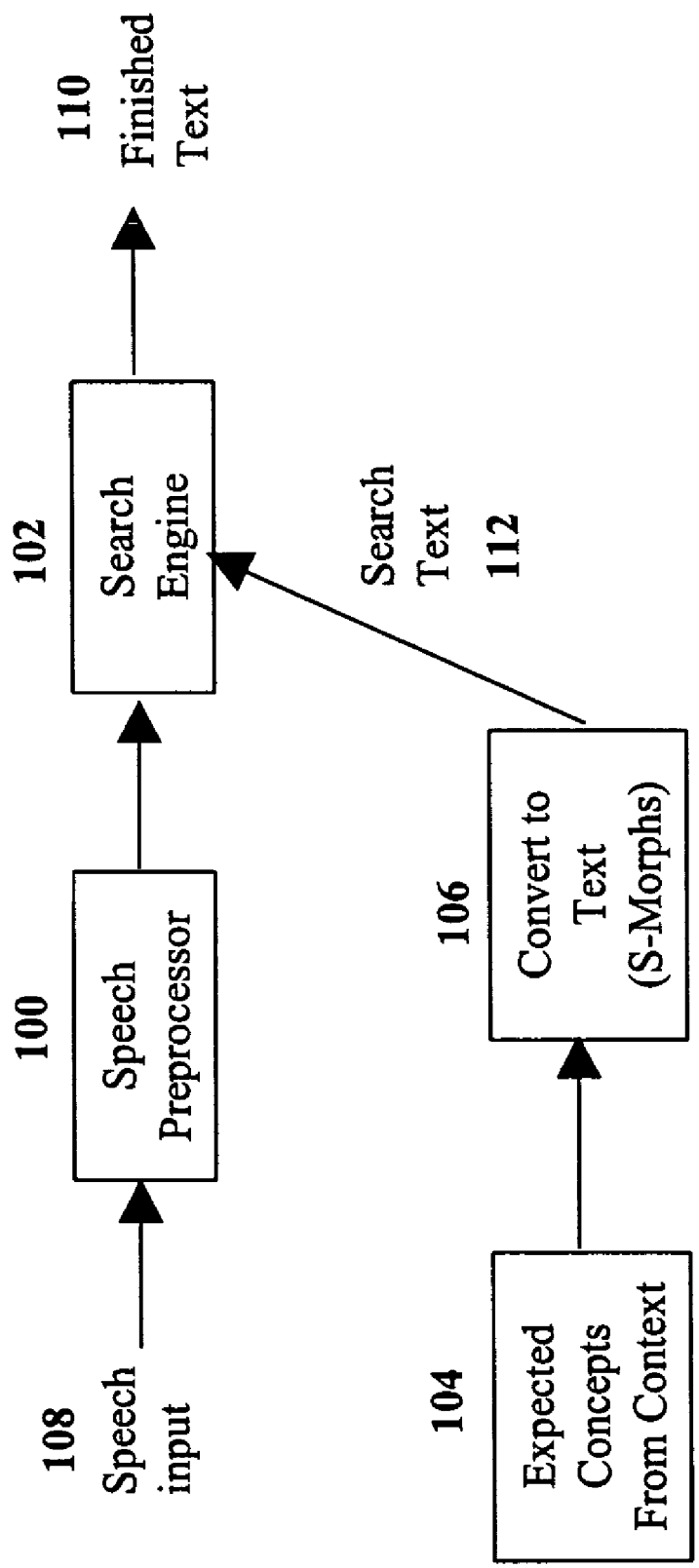
FIG. 8 is a block diagram of a speech recognizer.

Speech recognition is the art of automatically converting human spoken language into text. There are many examples of speech recognition systems. In implementations of the system in which the customer converses over the phone, speech recognition (performed by an on-line ASR) is the first step in matching the customer's communication with appropriate responses. Typical speech recognition entails applying signal processing techniques to speech to extract meaningful phonemes. Next, a software search engine is used to search for words from a dictionary that might be constructed from these phonemes. The speech recognition portion of the system guides this search by knowledge of the probable context of the communication. The block diagram of this speech recognition portion of the system is illustrated in FIG. 8. As described previously, the system has access to a knowledge base consisting of a mark-up language, CML, that defines a state transition graph of standard conversations between the customer and the contact call center. Because a software agent keeps track of the current state of the conversation, it can look up all of the probable transitions from this state. Each of these transitions has a "bag of concepts" or a "bag of S-Morphs" 104. These S-Morphs 104 may be converted into matching text 112. The aggregation of the matching text from all of the probable transitions is a subset of all of the words in the dictionary. In general, it is more efficient to search to match a subset of a group rather than the entire group. Thus, the search engine 102 for this speech recognizer first tries to match the phonemes of the customer's communication against the text 112 from all of the probable transitions. The search engine 102 searches in the dictionary for any remaining combination of phonemes not matched with this text.

The concept recognition engine 74 (shown in FIG. 5) used in some implementations of the system is an advanced natural language processing technology that provides a robust, language independent way of understanding users' natural language questions from both textual and audio sources. The technology automatically indexes and interacts with information based on the meaning, or semantic context, of the information rather than on the literal wording. The concept recognition engine understands the way people really talk and type, enabling the system to intelligently engage users in complex conversations independent of phrasing or language, to facilitate access to desired information.

The concept recognition engine is based on a morpheme-level analysis of phrases, enabling it to produce an "understanding" of the major components of the encapsulated meaning. This technique is computationally efficient, faster than traditional natural language technologies and language independent—in addition to being extremely accurate and robust.

Most other systems that apply natural language processing use syntactic analysis to find synonymous phrases for the user's entry. The analysis first identifies every word, or component of a word, in the phrase using extremely large linguistic dictionaries. Next, the systems attempt to match these elements to specific entries in a rigid list (i.e. word or keyword indices). As a result, these systems use matches based on the level of character strings; if at least one character is different from the target index entry, the match fails. With the concept engine used in some implementations of the system, the mapping is not based on a fixed set of words, phrases or word elements, but on a fixed set of concepts.

As a result of its emphasis on semantic processing, the concept recognition process is intrinsically robust—it works extremely well with "noisy" input data. This is useful to the system's ability to recognize the spoken word using speech recognition software. The system employs a process to accurately recognize meaning in real-world conversational interaction, despite common typographical mistakes, errors generated by speech recognition software, or out-of-context words. Users can say any combination of words, and the system is flexible enough to understand the users' intent.

The concept recognition engine is based on algorithms that create and compare semantic labels. A semantic label for a piece of text of any length is a short encoding that captures the most important components of its meaning. When items in the source data store(s) are labeled with semantic tags, they can be retrieved, or managed in other ways, by selectively mapping them to free-form voice or text queries or other input text sources—independent of the actual words and punctuation used in these input text sources. For example, a user asking the system "How can I bring back pants that don't fit?" will be provided with relevant information from an organization's return policy database, even if the correct information does not contain the words "pants" or "bring back" anywhere within it. Alternatively worded user queries seeking the same information are conceptually mapped to the same return policies, independent of the actual words used in the input string.

This approach bridges the gap between the advantages of statistical language model automatic speech recognition (SLM ASR) software and finite-state grammar ASR. This technology is called the concept recognition engine (CRE), a natural language processing algorithm.

The concept recognition engine (CRE) provides a robust, language independent way of understanding users' natural language questions from both textual and audio sources. The technology is an advanced natural language processing technology for indexing, mapping and interacting with information based on the meaning, or semantic context, of the information rather than on the literal wording. As opposed to the majority of other natural language efforts, the technology does not rely on a complete formal linguistic analysis of phrases in an attempt to produce a full "understanding" of the text. Instead, the technology is based on a morpheme-level analysis of phrases enabling it to produce an "understanding" of the major components of the encapsulated meaning.

Morphemes are defined as the smallest unit of language that contains meaning, or semantic context. A word may contain one or several morphemes, each of which may have single or multiple meanings. A relatively simple example of this is illustrated using the word geography that is comprised of the morphemes geo, meaning the globe, and graph that means illustration. These two distinct morphemes, when combined, form a concept meaning the study of the globe. Thus, individual units of meaning can be combined to form new concepts that are easily understood in normal communication.

The technology is based on algorithms for creating and comparing semantic labels. A semantic label for a given piece of text of any length is a short encoding that captures the most important components of its meaning. When the items in a "database" are labeled with semantic tags, they can be selectively retrieved or mapped to by parsing user-generated free-form text queries or other types of input text strings—independent of the actual words and punctuation used in the input strings.

CRE determines context in tandem with the SLM ASR by analyzing the resulting engine output and assigning semantic labels which can then be compared to an indexed database of company information. Furthermore, the CRE helps to suppress the effects of speech recognition errors by ignoring those words most commonly misrecognized (the small words) and using the more context-heavy words in its analysis. The effect, therefore, of the CRE is to enable self service systems that accurately recognize meaning in real-world conversational interaction, despite common typographical mistakes or errors generated by speech recognition software. More simply put, the combination of these two technologies enables systems to recognize what you say by understanding what you mean.

At design time, the CRE automatically indexes the data that will be searched and retrieved by users. In conversational applications, this data is the transcribed recordings of customer conversations with call center agents, but any set of textual information (documents, Frequently Asked Questions (FAQ) listings, free-text information within a database, chat threads, emails etc.) can be indexed using the CRE. Indexing is the process by which the CRE groups or 'clusters' data according to its conceptual similarity. Unlike the traditional alphabetical indices, the clusters created by the CRE are special conceptual references which are stored in a multi-dimensional space called concept space. They are 'labeled' using a set of primary atomic concepts (the basic building blocks of meaning) that can be combined to generate the description of any concept without having to manually create and maintain a specialized and very large database of concepts. Because concept indexing enables information to be searched or managed based by their meaning instead of words, a much more efficient, fault-tolerant and intelligent dialog management application can be developed. Through this clustering process, the CRE also extracts the transitions between clusters (i.e. the call flow) and generates an index that will later map free-form customer inquiries to agent responses found in the call log.

At run time, in some examples, the CRE performs this same process on customer inquiries in real-time. It takes the output from the speech recognition engine and breaks it down into its associated morpheme set using morphological analysis techniques. The system handles cluttered input data well, including misspellings, punctuation mistakes, and out of context or out order words, and there are no preset limitations on the length of the input phrase.

The CRE then uses concept analysis to convert morphemes into the primary atomic concepts described above, assembles this set of atomic concepts into a single concept code for the entire input and then maps that code to its equivalent code within the indexed data. In a conversational application, this process essentially 'points' user input to a system dialog state that may be a system response, existing interactive voice response (IVR) menu tree, or instruction to query transactional systems for customer account information.

This process yields a robust means of automatically recognizing and "understanding" highly ambiguous, conversational user queries within the context of a contact center self-service application.

The effect of this combination of CRE and SLM speech recognition is to enhance the ability to make information available to customers through automation. Corporate information that does not neatly fit into a five-option IVR menu or pre-defined speech grammar can be made available through a conversational interface. Because the resulting customer input has context associated with it, more options become available for how systems intelligently handle complex interactions.

The application of a vector model approach to semantic factors space instead of words space provides the following benefits:

1. The transition itself from words to concepts moves from being more statistical to being more semantic.

2. The traditional vector model is often called a "bag-of-words model" to underline combinatorial character of model ignoring any syntactic or semantic relationship between words. By analogy we can call the vector model a "bag-of-concepts model". In the traditional vector model we calculate some external parameters (words) statistically associated with internal parameters of our interest—concepts. In the vector model we calculate concepts directly.

3. As long as the number of semantic factors is much smaller than the number of words even in a basic language the computational intensity in the vector model is considerably lower. Other machine learning techniques can be used to form a confidence based ranking of matches. For example, one could use decision tree induction or construction of support vector machines. Combinations of learning techniques using boosting would also be possible.

We have described above separate parts of the whole two-step cycle of the model work: Input Language Text Object>Semantic Label>Output Language Text Object. It is important to see that the two steps in the cycle are clearly independent. They are connected only through the semantic label which is an internal "language" not associated with any of human languages. This feature makes it possible and relatively easy in any application to change the language on both the input and the output side.

The first step is essentially language-dependent. It means that switching to a different language requires automatic generation of the semantic label for a phrase in a given language. Below we describe two possible ways of solving this problem. The second step is based on the semantic index. The index itself does not care about the language of the objects, it just points to them and the semantic labels associated with pointers are language-independent. There is no language-specific information in the semantic index.

A first approach is compiling new S-Morph dictionaries for the new language. For each human written language a set of S-Morph can be compiled. The compilation process may be based on an analysis of a vocabulary either from a large corpus of text or from a big dictionary in this language.

Having such a complete set of S-Morphs in one language (English) is useful for creating a similar set of S-Morph in another language. As a starting point we may try to look just for morphemic equivalents in the second language. This reduces the effort of an otherwise labor-intensive corpus analysis in the second language. It is especially true when we move from language to language in the same group of languages because such languages share a lot of lexical "material". The set of Spanish S-Morphs is about the same size as the English one. The examples of Spanish S-Morphs are: LENGU, FRAS, MULTI, ESPAN, SIGUI.

After this is done we may need some tuning of the algorithm of S-Morph identification. The good news about this algorithm is that most of its job is common for the languages of the same group. Even when switching from English to Spanish without any changes in the algorithm, the results were satisfactory. Few if any changes may be needed for most of the Indo-European languages. The Spanish experiment demonstrated the power of system's cross-language capabilities: after we have compiled Spanish morphemes Spanish as an input language became possible for all applications previously developed for English.

A language knowledge base is used to store the information needed for the concept recognition engine. This knowledge base has three major components: semantic factor dictionary, S-Morph dictionaries and synonym dictionary. Each entry in the semantic factor dictionary includes:
  a) Semantic factor name;
  b) Semantic factor definition/description;
  c) Example of a word concept code which uses this semantic factor.

Each entry in the S-Morph dictionaries includes:
  a) S-Morph text;
  b) Semantic factor concept code with separate parts—Sememes for alternative meanings of polisemic morphemes;
  c) In multifactor codes labels for head factors to which modification can be applied.

Figure 9:
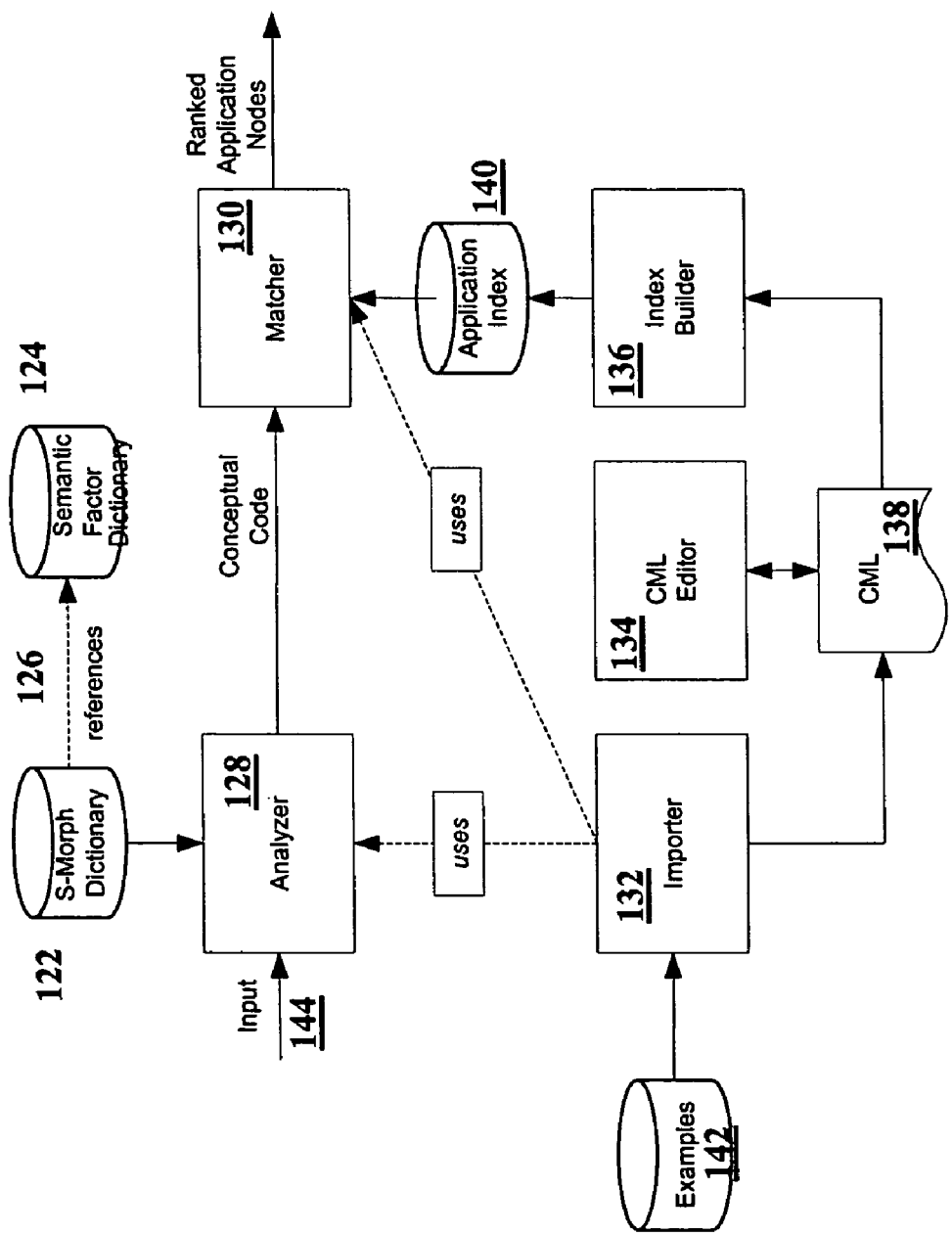
FIG. 9 is a block diagram of a concept recognition engine.

A functional block diagram of the concept recognition engine is illustrated in FIG. 9. The blocks of this diagram are described as follows. The S-Morph dictionary 122 and Semantic Factor Dictionary 124 are used the Analyzer 128 to produce a set of concept codes.

Next, the CML file is generated on the basis of examples 142. This results in a CML file that is data driven on the basis of a thesaurus. The next step is to do lookup and editing of the CML file. This lookup and editing consists of the following steps:
  a) Displaying string occurrences with different search criteria;
  b) Adding a new paraphrase;
  c) Adding a new pair question-answer;
  d) Removing a paraphrase or few paraphrases;
  e) Removing a pair question-answer (with all paraphrases) or few pairs;
  f) Merging two pairs question-answer (with the choice of input and output phrases);
  g) Splitting one pair into two pairs with assigning of input and output phrases;
  h) Editing phrases (including group editing).

Next, the CML file is taken as input information at any point of editing and an index is built. Subsequently, two entries are matched and a similarity calculation with a specified CML/index is done. This may be done for two phrases; for two concept codes; for a phrase and a concept code; for two phrases, for two concept codes, or for a phrase and a concept code in a cyclic mode with one of the inputs coming each time from the feeding file; and for automatic matching and similarity calculation with one of the inputs coming each time from the feeding file and the results stored in an output file. Next, preanalysis parsing is done by creating pseudofactors for names; processing single-word and multi-word personal names; processing single-word and multi-word names for businesses and products; and generating part-of-speech tags.

At this point, application control and testing is performed. This consists of the following steps:
  a) Analyzing a file of input conversations both by cycles and automatically with differences with previous processing of the same file either displayed or sent to the output file.
  b) Control of the similarity threshold;
  c) Delta interval (gap in similarity between the first and second match);
  d) Control of the number of matches returned.

The conversation mark-up language's (CML) main goal is to specify a set of instructions to the conversation server for handling "conversations" with customers in an automated or semi-automated manner. Automated conversations are those that are handled entirely by the conversation server from beginning to end. Semi-automated conversations are handled first by the conversation server, and then passed off to a human agent, along with any information that has been collected.

CML is a markup language that specifies the following:
Customer inputs, including paraphrases that the conversation server can process.
Conversation server outputs (e.g. TTS and/or audio files) to respond
The flow of a conversation. This flow is describe using a set of state transition networks which include:
  Contexts in which each input and output can occur.
  Transitions to other contexts, based on customer input and the results from Java objects.
  Calls to back end business tier objects
  Inline application logic In addition to the CML language for describing the conversations between the conversation server and user, the CMLApp language allows applications to be constructed from reusable components.

In some examples, the CML describes the request/response interactions typically found in particular customer support contact centers which include the following:
  General information requests such as stock quotes, fund prospectus requests, etc.
  Customer-specific request such as account balances, transaction history, etc.
  Customer initiated transactions such as a stock/find trade, etc.
  Center-initiated interactions such as telemarketing, etc.

CML is designed to be interpreted and executed by a conversation server (CS). As explained earlier, the CS has the set of software agents that interpret CML based applications. These agents are fronted by a set of interaction channels that translate between channel specific document language such as HTML, VoiceXML, SIMPL, SMTP and CML's channel-independent representation, and visa versa.

A CML document (or a set of documents called an application) forms the conversational state transition network that describes the software agent's dialog with the user. The user is always in one conversational state, or context, at a time. A set of transitions defines the conditions under which the dialog moves to a new context. These conditions include a new request from the user, a particular state within the dialog, or a combination of the two. Execution is terminated when a final context is reached.

Four elements are used to define the state transition networks that are the dialogs between the software agent and the user: Networks, Context, Subcontext, and Transitions.

A network is a collection of contexts (states) and transitions defining the dialog a software agent has with a user. There may be one or more networks per CML document each with a unique name by which it is referenced. In addition to defining the syntax of a dialog with the user, a network defines a set of properties that are active while the network is actively executing. These properties hold the data that is being presented in the output to the user as well as data that govern the execution of the network. For example, the pre-conditions of transitions and post-conditions of context are defined in term of properties.

Contexts represent the states within the dialog between software agents and users. Every context has a set of transitions defined that take the application to another context (or loops back to the same context). A context represents a state where a user's request is expected and will be interpreted. Certain contexts are marked as final. A final context represents the end of the dialog represented by the network.

A subcontext is a special context in which another network is called within the context of the containing network. Subcontexts are linked subroutine calls and there is a binding of the properties of the calling and called network. Subcontexts may be either modal or non-modal. In a modal subcontext, the transitions of its containing network (or ancestors) are not active. In a non-modal subcontext, the transitions of its containing network (and ancestors) are active.

A transition defines a change from one context to another. A transition is taken if its precondition is met and/or the user request matches the cluster of utterances associated with the transition. If a transition does not define a precondition, then only a match between the user request and the transition's utterances is required to trigger the transition. If a transition does not define a cluster of utterances then the transition will be triggered whenever its precondition is true. If neither a precondition nor a cluster of utterances is defined, the transition is automatically triggered. The triggering of a transition results in the execution of the transition's script and the transition to the context pointed to by the transition.

Figure 10:
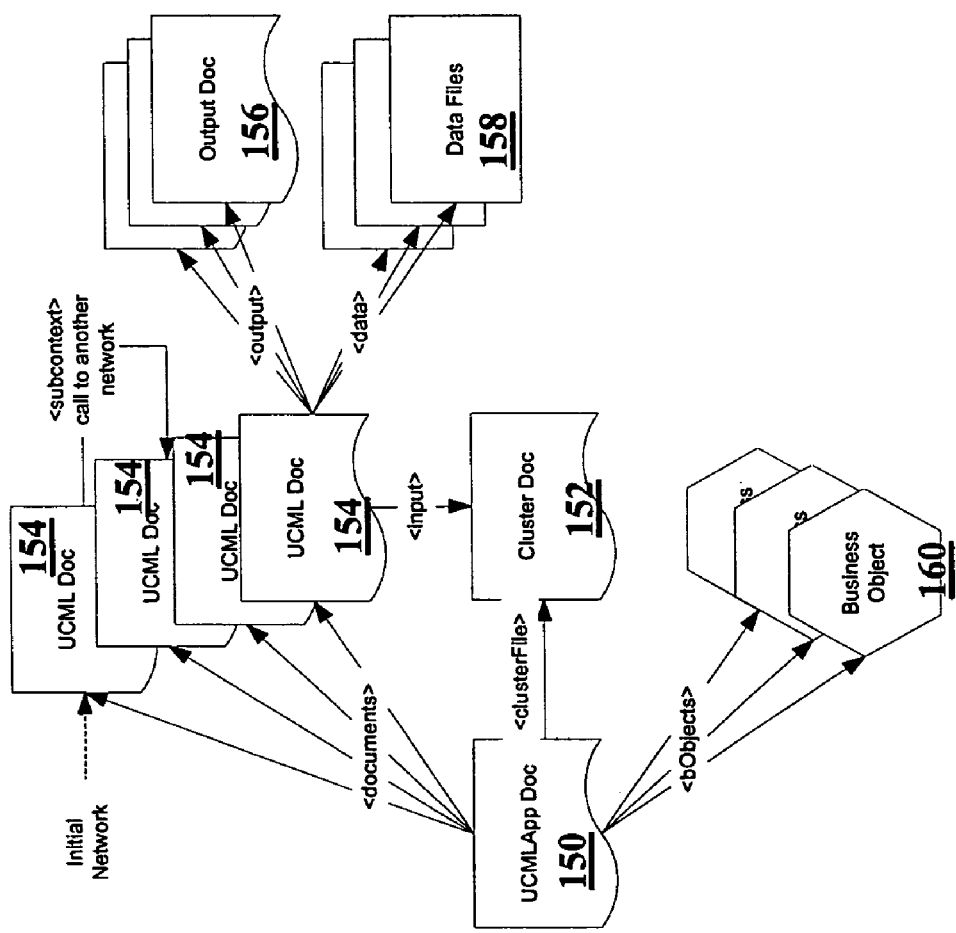
FIG. 10 is a view of an organization of markup language documents.

In some examples, a CML application requires a single CMLApp document, a single CML document, and a cluster document. A multi-document application entails a single CMLApp document, a single cluster document, and multiple CML documents. FIG. 10 shows the relationships of a CMLApp document 150, CML documents 154, a cluster document 152, output documents 156, referenced data files 158, and business objects 160.

Appendix 1 sets forth the text of an example of a CMLApp document named "abc12app.ucmla, a CML cluster document named "abc12clusters.ucmlc", and a CML document named "abc12ucml.ucml". The CMLApp document specifies the cluster file using the mark-up "clusterFile" and the CML file using the mark-up "document". The CMLApp document also specifies the channel of communication with the customer using markup "channel type". In this case, the channel type is "VXML". First, the cluster document stores the text of all of the recorded communications from customers that were grouped together into a cluster for a given transition from a given state or context. In the example cluster document, clusters are named c1 through c41. Data variables associated with the clusters are specified using the mark-up "variable" and have such types as "properName", and "digitString". These clusters are referenced in the example CML document. A CML document defines the state transition graph (or network). The example CML document defines a set of states (denoted by mark-up "context name") and transitions (denoted by mark-up "transition name"). For instance, lines 11-16 of the CML document are as follows:

---

"<context name="s0" final="false" toToAgent="false">.
    <transitions>
        <transition name="t0" to="s1">
            <input cluster="c7">yeah I'd like to check on the my account balance please </input>
            <output> do you have your account number sir </output>
</transition>

---

Figure 11:
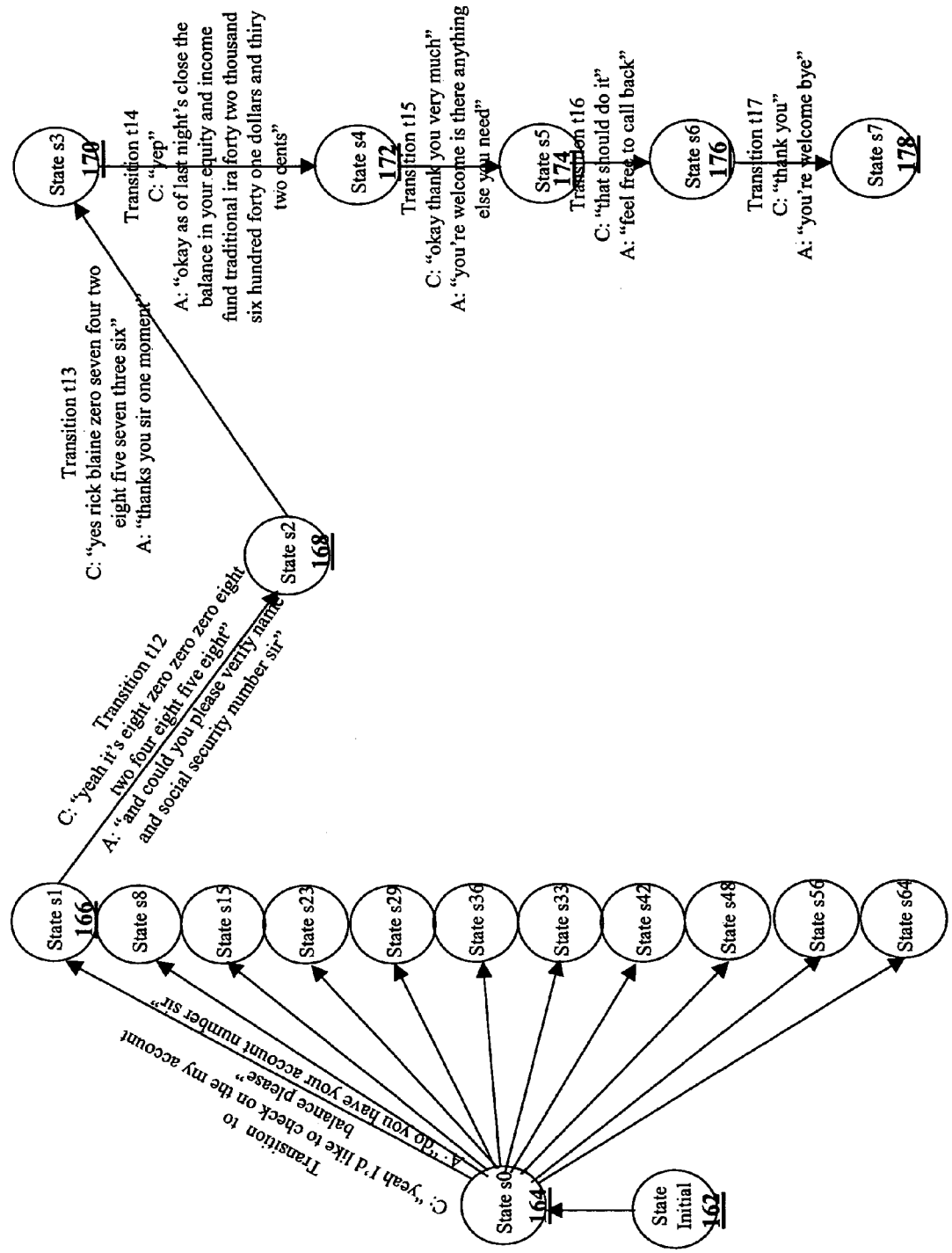
FIG. 11 is a view of a subset of the state transition graph for an example graph.

Lines 11-16 specify that there is a state (or context) s0 that has a transition t0 to state (or context) s1. Transition t0 has a customer communication "yeah I'd like to check on the my account balance please" and a contact center response "do you have your account number sir". FIG. 11 illustrates a subset of the total state transition graph defined by the example CML document. This subset includes the transitions from the initial state to s0 (162) to s1 (164) to s2 (166) to s3 (168) to s4 (170) to s5 (172) to s6 (174) and finally to s7 (176).

Figure 12:
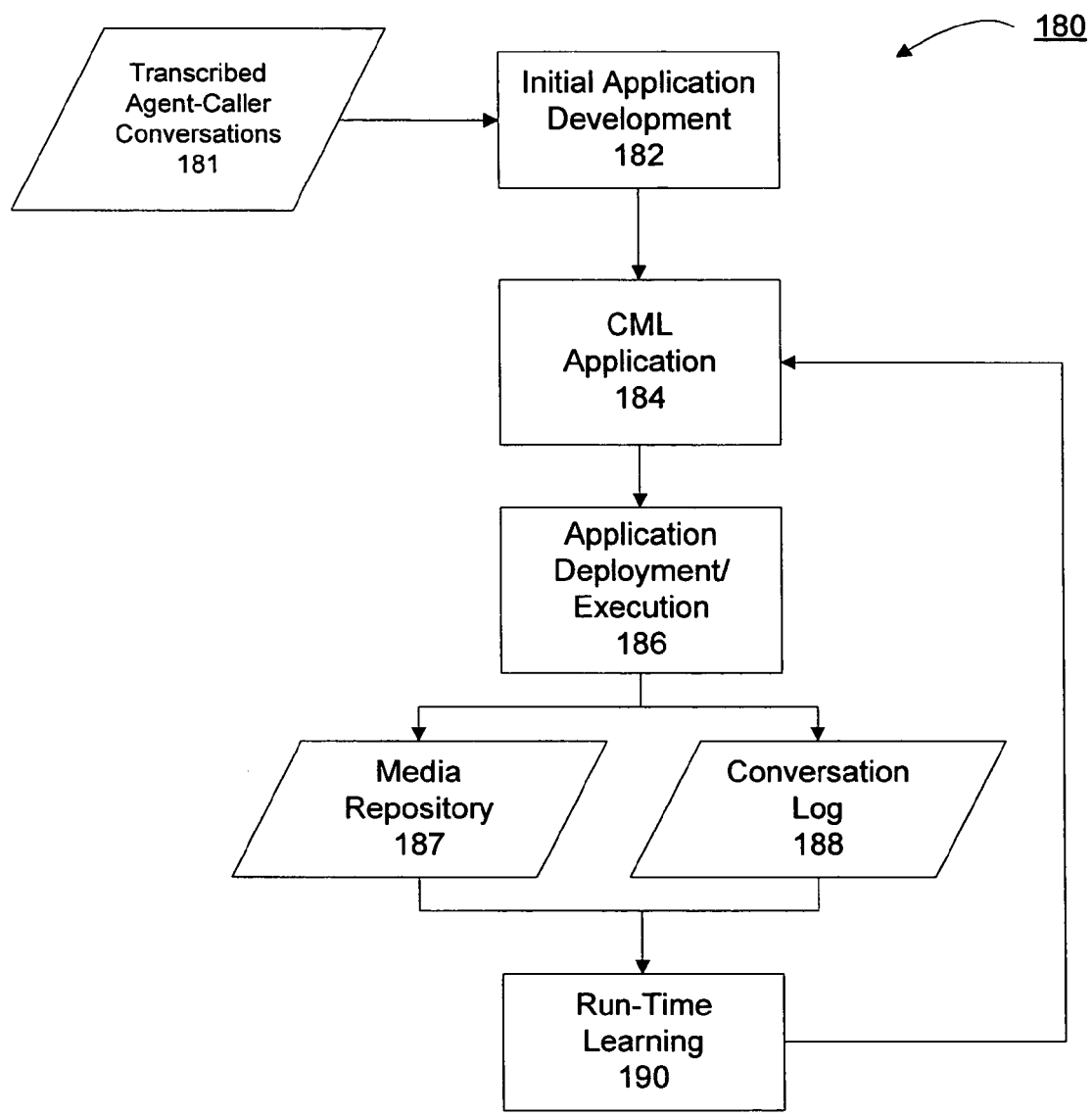
FIG. 12 is a view of an iterative application development process.

Referring to FIG. 12, a process 180 for development of a CML application for an automated voice response system includes two primary machine learning processes, an initial application development process 182 and a run-time learning process 190. The initial application development process 182 generates an initial CML application using samples of recorded human agent-caller conversations. The run-time learning process 190 uses samples of recorded system-caller conversations to continually improve the CML application.

A set of transcribed human agent-caller conversations 181 are input into the initial application development process 182. The transcribed agent-caller conversation 181 are recorded conversations between human customer support agents and callers that have been transcribed into text using manual transcription or an automated transcription process (e.g., a conventional voice recognition process). In contact centers in which human agents and callers communicated by telephone, samples of agent-caller conversations may be obtained from the quality assurance audio recording facilities of the contact center. In one implementation, the sample human agent-caller transcripts are in the form of Import Markup Language (IML) files when supplied to the initial application development process 182.

The initial application development process 182 uses the sample transcripts to build an initial CML application. The initial application development process (an example of which is described in more detail in FIGS. 15-16) involves the following three phases:

1. Build Classifiers. In this phase, sets of classifiers for agent utterances and caller utterances are built using samples of recorded human agent-caller conversations. When the application is deployed and goes on-line, these classifiers are used to classify caller utterances. After a caller utterance is classified, the software agent can determine the appropriate response using the finite state network. Prior to deployment of the application, the two sets of classifiers can also be used to generate the finite state networks and to identify and develop effective agent requests for information.

2. Generate Finite State Networks. In this phase, the dialogs are captured as finite state networks or context free networks using subContexts. The CML element, context (or state), is the principal state definition construct.

3. Code Insertion Phase. In this phase, the state networks are incorporated into the application to effect the automation associated with the dialog. With respect to the phase in which classifiers are built, it can be advantageous, especially in a call center application, to first cluster agent utterances into a set of classifiers and then use those agent classifiers in locating and classifying caller utterances.

In a call center application, dialogues between a caller and a human agent are typically controlled by the agent. Indeed, agents are often instructed to follow standardized scripts during conversations with callers. These scripts are intended to direct and constrain agent-caller conversations so that answers are caller inquiries are provided in a reliable and efficient manner. A common rule for human agents is that they should never lose control of the conversation flow.

If caller and agent utterances are clustered based on the meaning of the utterance using, for example, a Term-Frequency-Inverse Document Frequency (TF-IDF) algorithm, the distributions of agent and caller clusters appear quite different.

The distribution of caller utterance clusters tends to have a few very common response clusters (e.g., a cluster of utterances in which caller said a number or identified herself) followed by a rapid decrease in cluster frequencies for a relatively small number of less common responses, and then a very long tail of singleton clusters. Singleton clusters typically account for half of the total caller utterances, and constitute about 90-95% of the total clusters. Utterances that represent the caller's initial request for information (e.g., "What is my account balance?"), which represent one of the most important types of caller utterances for design of an automated voice response system, typically form a very small percentage of the overall utterances (about 1 out of every 20-30 utterances, depending on call length). Because there are many ways in which a particular request can be phrased, these initial caller request utterances types are usually arrayed over the entire distribution, with many utterances falling into their own singleton categories.

The distribution of agent utterance clusters is typically much different than the distribution of caller utterance clusters largely because of the scripted nature of agent utterances. In particular, the distribution of agent utterance clusters (using a TF-IDF algorithm to cluster the agent utterances) is much flatter than the distribution observed for callers, with lower overall frequencies for the most common utterance clusters and a much more gradual decrease in cluster frequencies. Because agents often engage in conversation with callers, the distribution of agent utterance clusters also has a long tail of singletons. Another difference between the distributions of agent and caller clusters in the call center environment is that the high frequency agent clusters tend to contain the information gathering queries (e.g., "Can I have your social security number, please?"), which are the most important utterances for design of an automated voice response system. Indeed, it is often possible to characterize nearly all of the important agent behavior (e.g., agent requests for information) by analyzing the most frequent 20% of the clusters.

Figure 15:
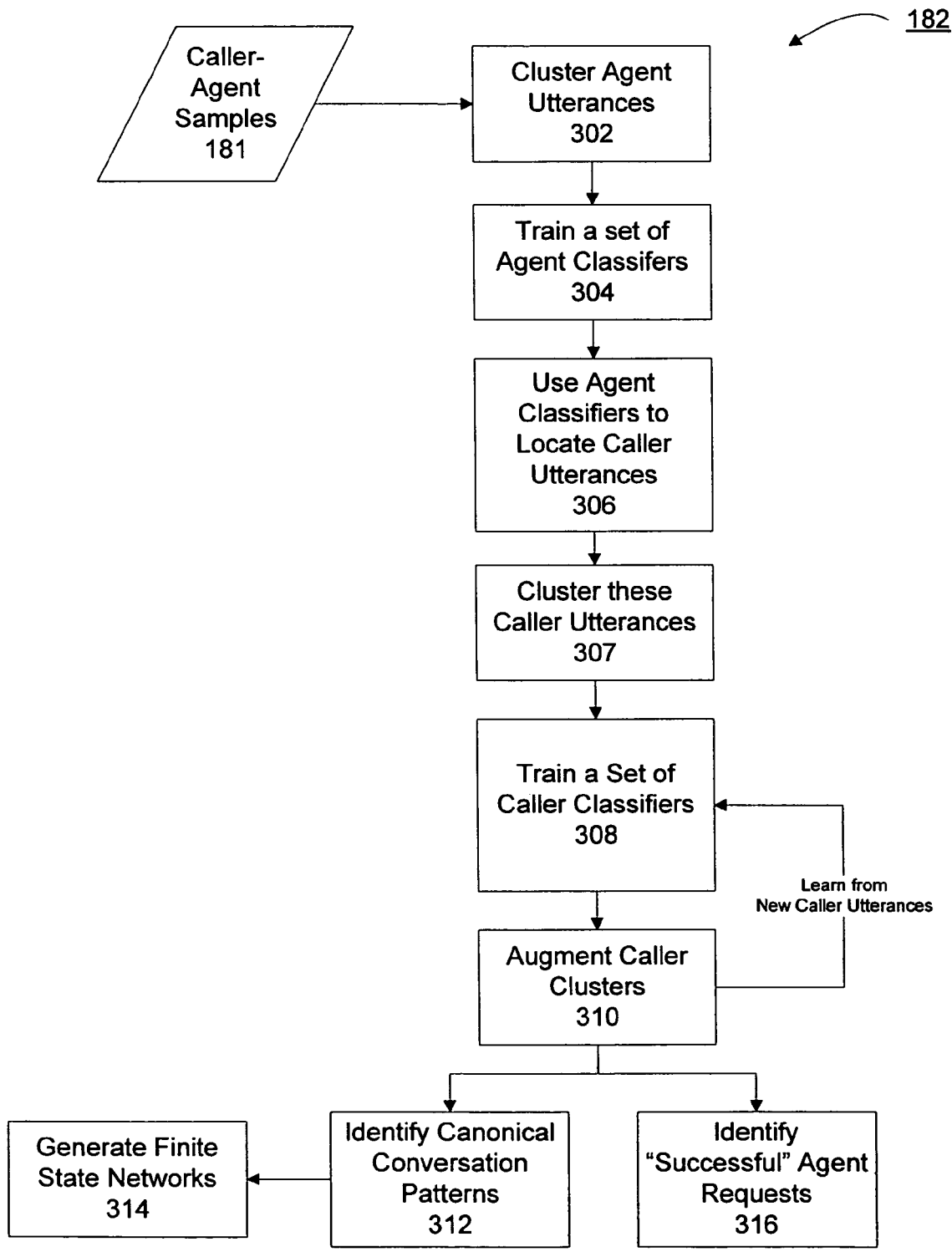
FIG. 15 is a view of a initial application development process.

Referring to FIG. 15, an initial application development process 182 uses an agent-centric data mining technique that first generates a set of agent classifiers and then uses the set of agent classifiers to identify and generate a set of caller classifiers.

The initial application process 182 receives as input a statistically significant number of prerecorded caller-agent conversations 181 that have been transcribed into text. All agent utterances in the prerecorded caller-agent conversations are clustered 302 into a set of agent clusters, and the significant agent clusters (e.g., those clusters with utterances in which the agent elicits information from a caller) are then identified. These significant agent clusters are then used to train (i.e., are input to) 304 a machine learning process, for example, a Support Vector Machine (SVM), from which a set of agent classifiers are generated.

Once the agent classifiers are generated, these classifiers are used to locate 306 caller responses within the transcribed conversations. These caller utterances are then clustered 307 into a set of caller clusters. These clustered caller utterances are then used to train 308 (i.e., are input to) a machine learning process, for example, a Support Vector Machine, from which a set of caller classifiers are generated. After the sets of agent and caller classifiers are determined, they can be used to classify agent and caller utterances in new conversation transcripts. Appropriate caller responses to important agent queries are then automatically extracted from the new transcripts and added to the caller clusters. These augmented caller clusters are then used to build a new, improved set of caller classifiers 310.

Given a set of transcribed conversations, the utterances of which have been classified using a set of agent and caller classifiers, canonical agent conversation patterns can be identified 312. Canonical conversation patterns are common patterns of informational requests and answers used by agents in responding to particular types of caller requests. For example, if a caller contacts an agent and requests his or her account balance, a common response pattern among agents is to ask question X (e.g., "What is your name?"), followed by question Y (e.g., "What is your social security number?"), followed by question Z (e.g., "What is your mother's maiden name?"). On the other hand, if the caller requests literature, the agent's question X may be followed by question A (e.g., What is your zip code?") and question B (e.g., "What is your street address?"). These canonical conversation patterns may be used in generating 314 a finite state network for the application.

In addition, pairs of classified agent and caller utterances in transcribed conversations can be used to identify 316 successful agent requests for information. Examining distributions of the types of caller responses to differently worded agent questions that were intended to elicit the same information can reveal that one way of asking for the information is more effective than other ways. For example, a first agent request phrased "May I have your social security number?" may have a significant number of caller responses of "yes" without providing the caller's social security number. However, another agent classifier that classifies an agent request phrased "What is your social security number?" may yield a distribution in which a very high percentage of the caller responses to the question provided the requested information (i.e., the caller's social security number).

One example of an initial application development process is shown in more detail in FIGS. 16A-16E.

Figure 16A:
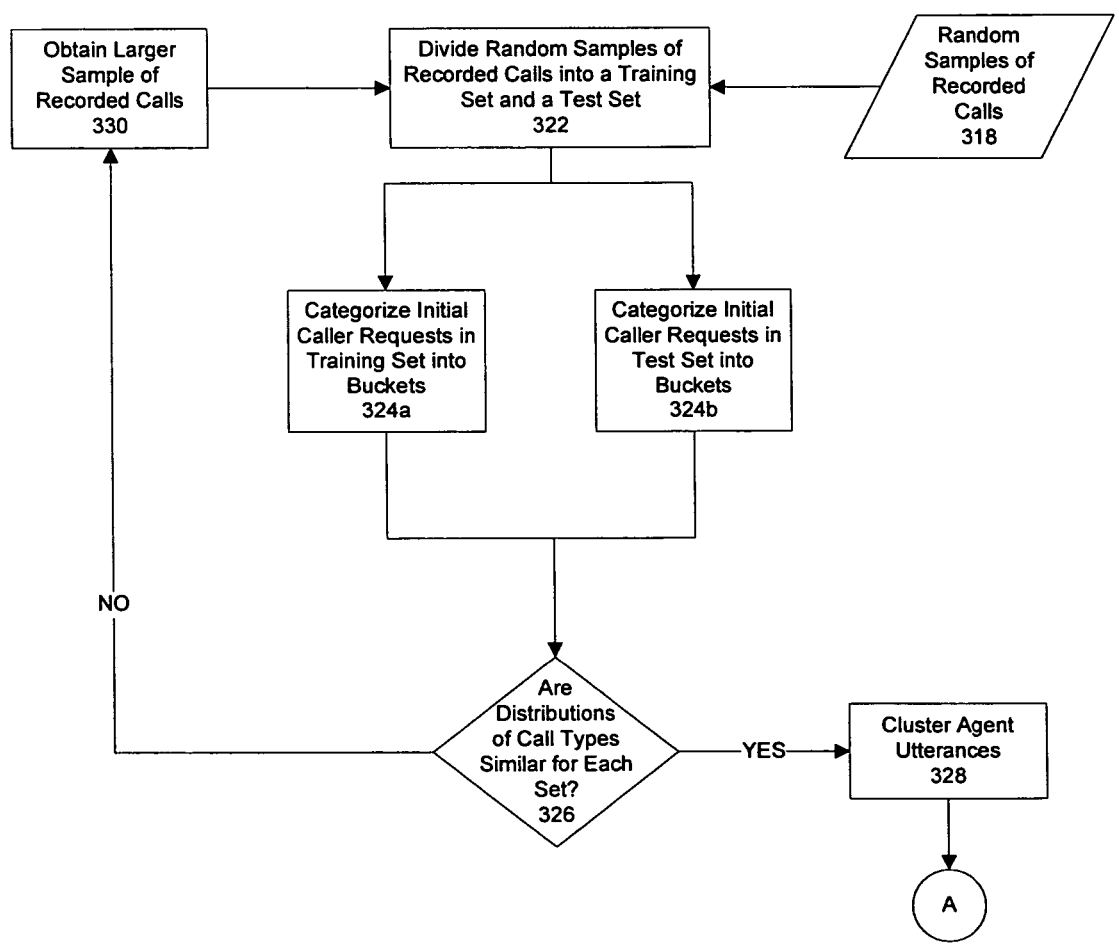
FIGS. 16A-16F are views of an initial application development process.

As shown in FIG. 16A, an initial application development software tool collects 322 two equal sized, randomly selected samples of recorded human agent-caller conversations 318, a training set and a test set. The application developer then categorizes 324a, 324b the calls from each sample into a set of buckets according to the initial caller request of the caller. For example, calls in which the caller requested their account balance may be placed in one bucket, whereas calls in which the caller requested a change of address may be placed in a separate bucket.

After an application developer categorizes the calls into buckets, the application developer uses the software tool to examine the distributions 326 of initial caller requests for each set of calls. If the distributions of the training and test sets of calls are not similar, the application developer obtains a larger sample of randomly selected calls 330 and repeats the bucketing process until the training and test sets yield similar call-type distributions.

Once the training and test sets are determined to have similar call-type distributions, the application developer uses a software tool to cluster 332 the agent utterances of the calls in the training set. To cluster the agent utterances, the software tool runs the utterances through the concept recognition engine (described in more detail above) to determine a list of semantic features for each utterance, and then uses the TF-IDF algorithm to cluster the utterances based on their list of semantic features.

Figure 16B:
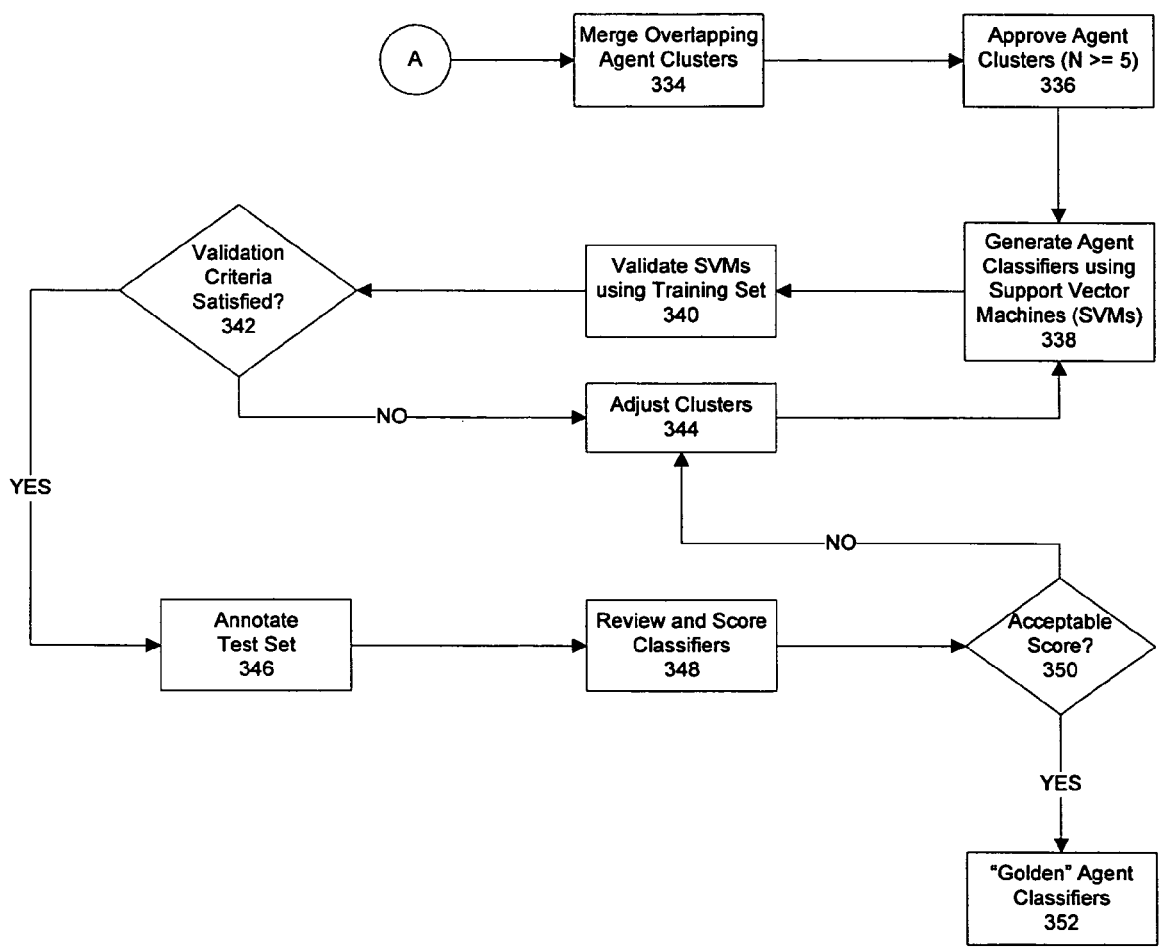

Referring to FIG. 16B, the application developer examines the agent clusters, merges 334 any overlapping clusters, and approves 336 the agent clusters having more than a certain number of utterances (e.g., more than 4 utterances) for use in classification. An application developer typically would not classify every agent cluster since the clusters having a low frequency of occurrences are unlikely to be agent utterances in which the agent has elicited substantive information from the caller (e.g., "Can I have your name, please."). Rather, the low frequency clusters (e.g., singleton clusters) are likely to contain agent utterances in which the agent has engaged the caller in conversation (e.g., "How is the weather there today?").

After the application developer approves the clusters (e.g., using a graphical user interface to the software tool), the application developer commands the software tool to generate a set of classifiers based on the conceptual features of the utterances in the approved clusters (i.e., the training data). A set of classifiers is the output of a machine learning process (e.g., decision tree, support vector machine). The classifiers are used to determine which cluster from the training set each new utterance is most similar to. In a preferred implementation, the software tool builds a set of classifiers using a support vector machine (SVM) machine learning process. This process yields a set of pairwise discriminators, one for each cluster compared with all other, which are then applied to new utterances. The cluster that "wins" the most number of comparisons is determined to be the cluster in which the new utterance should be attributed. For example, if a classifier is built using a SVM for three clusters, the classifier will have a set of three pairwise discriminators for comparing cluster 1 to cluster 2, cluster 1 to cluster 3, and cluster 2 to cluster 3. When a new utterance is presented to the classifiers, each of the three comparisons is applied to the semantic factors (determined by the conversation recognition engine) of the utterance. Whichever cluster "wins" the most number of comparisons, is considered to be the cluster in which the utterance should be attributed.

Once a set of agent classifiers has been built, the training set of calls is fed into the classifiers to verify 340 the integrity of the classifiers. The integrity of the classifiers is checked by comparing the clusters in which the classifiers attributed the agent utterances of the training set to the clusters in which the agent utterances were classified prior to the generation of the agent classifiers. If the classifiers do not classify the training set such that they do not meet some validation criteria (e.g., classifiers must classify at least 98% of the agent utterances in the training set into their proper cluster), then the application developer adjusts 344 the original clusters and rebuilds the agent classifiers 338.

Once the classifiers satisfy the validation criteria, the agent utterances in the test set of calls are annotated 346 using the classifiers. This means that the agent utterances have been classified and a tag identifying the cluster to which the utterance was deemed most similar has been associated with each agent utterance. For example, an agent utterance "What is your social security number?" may be annotated with the tag "REQ_SSN" indicating that the agent utterance was classified in a cluster corresponding to an agent's request for the callers social security number.

After annotating the agent utterance in the test set, the application developer reviews 348 the annotations and scores the annotated test set according to whether the agent utterance was classified correctly. For example, if an agent utterance "What is your social security number?" is classified as "REQ_ADDRESS", the application developer would score this classification as incorrect. If the application developer is not satisfied that the score (e.g., the percentage of correct classifications) is acceptable 350, the application developer adjusts 344 the original clusters and rebuilds the agent classifiers 338.

Once the application developer is satisfied that the test set has obtained an acceptable score, the current agent classifiers are set as the "golden" agent classifiers.

Figure 16C:
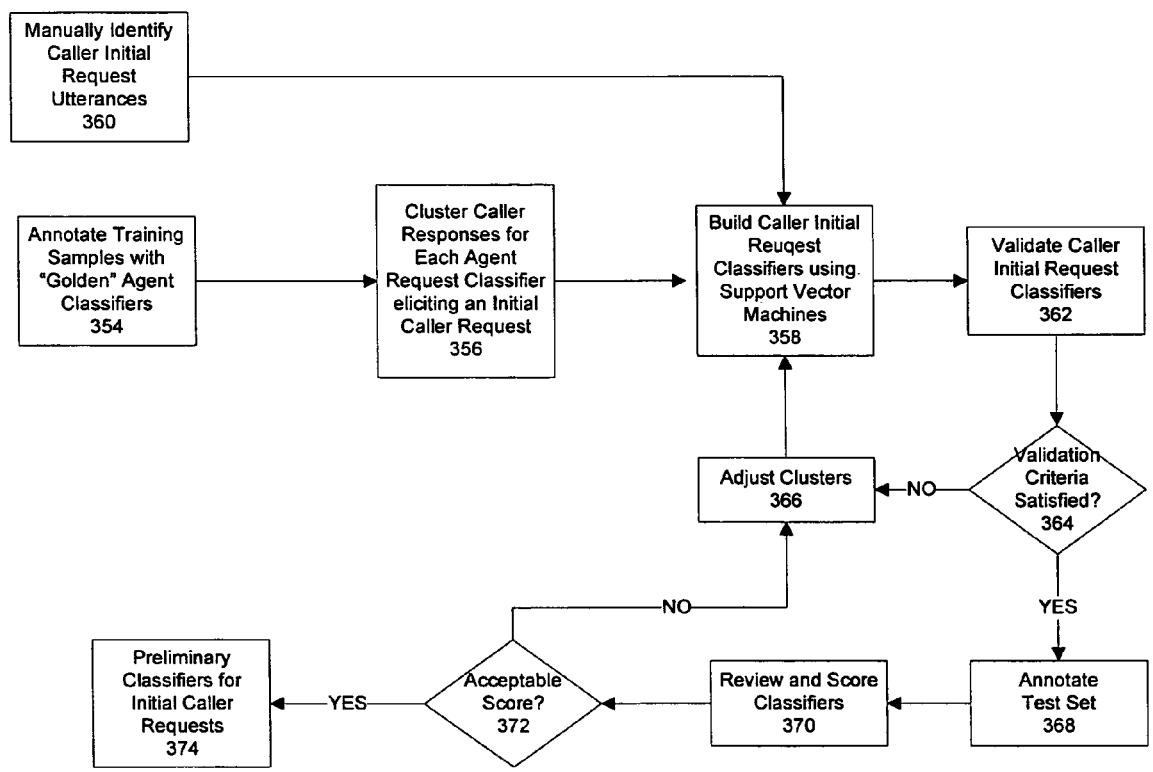

Referring to FIG. 16C, a process for developing an set of caller initial request classifiers is illustrated. Caller initial requests refer to the utterance that identifies the caller's primary reason(s) for making the call (e.g., a request for the caller's current account balance, a request for an address change, etc.).

As shown in FIG. 16C, the agent utterances of the training set of calls are annotated 354 with the "golden" agent classifiers using the software tool. The software tool then clusters 356 caller responses to agents classifiers corresponding to an agent's request for the caller's initial request (e.g., a classifier corresponding to "How may I help you?").

The clustered caller initial requests are then used to build 358 a set of classifiers for a caller's initial requests (e.g., using a support vector machine).

Because the number of caller utterances corresponding to a caller's initial request is small (usually only one initial request per call), an application developer may elect to manually identify 360 the caller request utterances by, for example, reading the text of the calls and placing the initial request(s) for each call in a cluster.

Once an initial set of caller initial request classifiers has been built, the classifiers are validated 362 by feeding the training set of calls through the classifiers and comparing the clusters in which the classifiers attributed the caller initial request utterances of the training set to the clusters in which the caller initial request utterances were classified prior to the generation of the caller initial request classifiers. If the classifiers do not classify the training set such that they do not meet some validation criteria (e.g., classifiers must classify at least 95% of the caller initial request utterances in the training set into their proper cluster), then the application developer adjusts 366 the original clusters and rebuilds the caller initial request classifiers 358.

Once the validation criteria is satisfied, the test set of calls is annotated 368 with the caller initial request classifiers and then reviewed and scored 370 by the application developer. If the initial request classifiers do not result in an acceptable score, the application developer adjusts the clusters and rebuilds the classifiers. (Note that if the clusters are adjusted based on information gleaned from the test set, then the assessment of the SVMs built from the adjusted clusters should be tested on a new set of test data.) Once the initial request classifiers result in an acceptable score, a preliminary set 374 of caller initial request classifiers is formed.

Figure 16D:
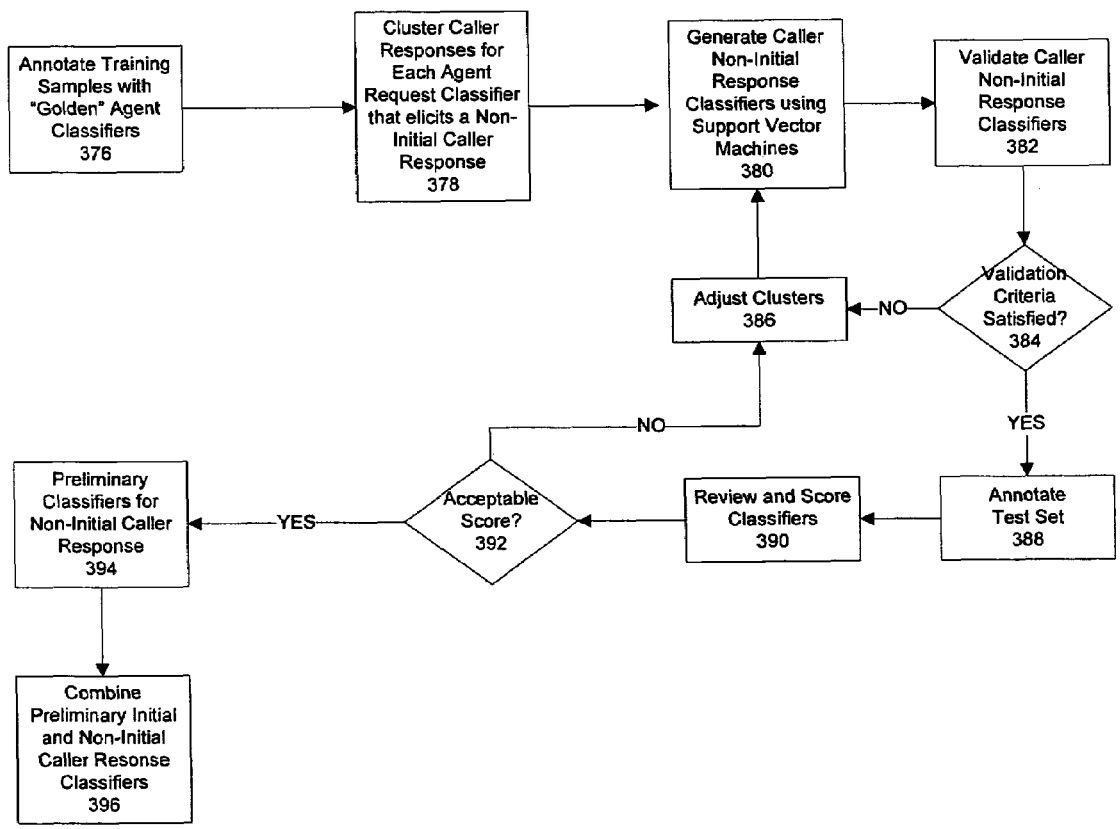

Referring to FIG. 16D, a process for building a set of non-initial caller responses to agent requests for information is illustrated. The process illustrated in FIG. 16D is similar to the process illustrated in FIG. 16C. Like the process shown in FIG. 16C, the process shown in FIG. 16D uses the "golden" agent classifiers to locate caller utterances. However, in the process shown in FIG. 16D, the caller utterances that are classified are those utterances which correspond to agent's requests for non-initial request information (i.e., caller utterances in which the caller responded to agent's requests for information other than an agent's request for the purpose of the caller's call). Caller responses to agents' requests for the caller's name, address, social security number, and data of birth are examples of caller utterances that correspond to agents' requests for non-initial request information.

As shown in FIG. 16D, the agent utterances of the training set of calls are annotated 376 with the "golden" agent classifiers using the software tool. The software tool then clusters 378 caller responses to agent classifiers corresponding to an agent's request for information other than the caller's initial request (e.g., a classifier corresponding to "What is your social security number?").

The clustered caller responses to agent's non-initial informational requests are then used to build 380 a set of classifiers for a caller's non-initial responses (e.g., using support vector machines).

Once an initial set of caller non-initial response classifiers has been built, the classifiers are validated 384 by feeding the training set of calls through the classifiers and comparing the clusters in which the classifiers attributed the caller non-initial response utterances of the training set to the clusters in which the caller non-initial response utterances were classified prior to the generation of the caller non-initial response classifiers. If the classifiers do not classify the training set such that they do not meet some validation criteria (e.g., classifiers must classify at least 98% of the caller utterances in the training set into their proper cluster), then the application developer adjusts 386 the original clusters and rebuilds the caller non-initial response classifiers.

Once the validation criteria is satisfied, the test set of calls is annotated 388 with the caller non-initial response classifiers and then reviewed and scored 390 by the application developer. If the non-initial response classifiers do not result in an acceptable score, the application developer adjusts 386 the clusters and rebuilds the classifiers. Once the non-initial response classifiers result in an acceptable score, a preliminary set 394 of caller non-initial response classifiers is formed.

The preliminary set of non-initial caller response classifiers and initial caller request classifiers are combined 396 to form a combined set of preliminary caller classifiers.

Figure 16E:
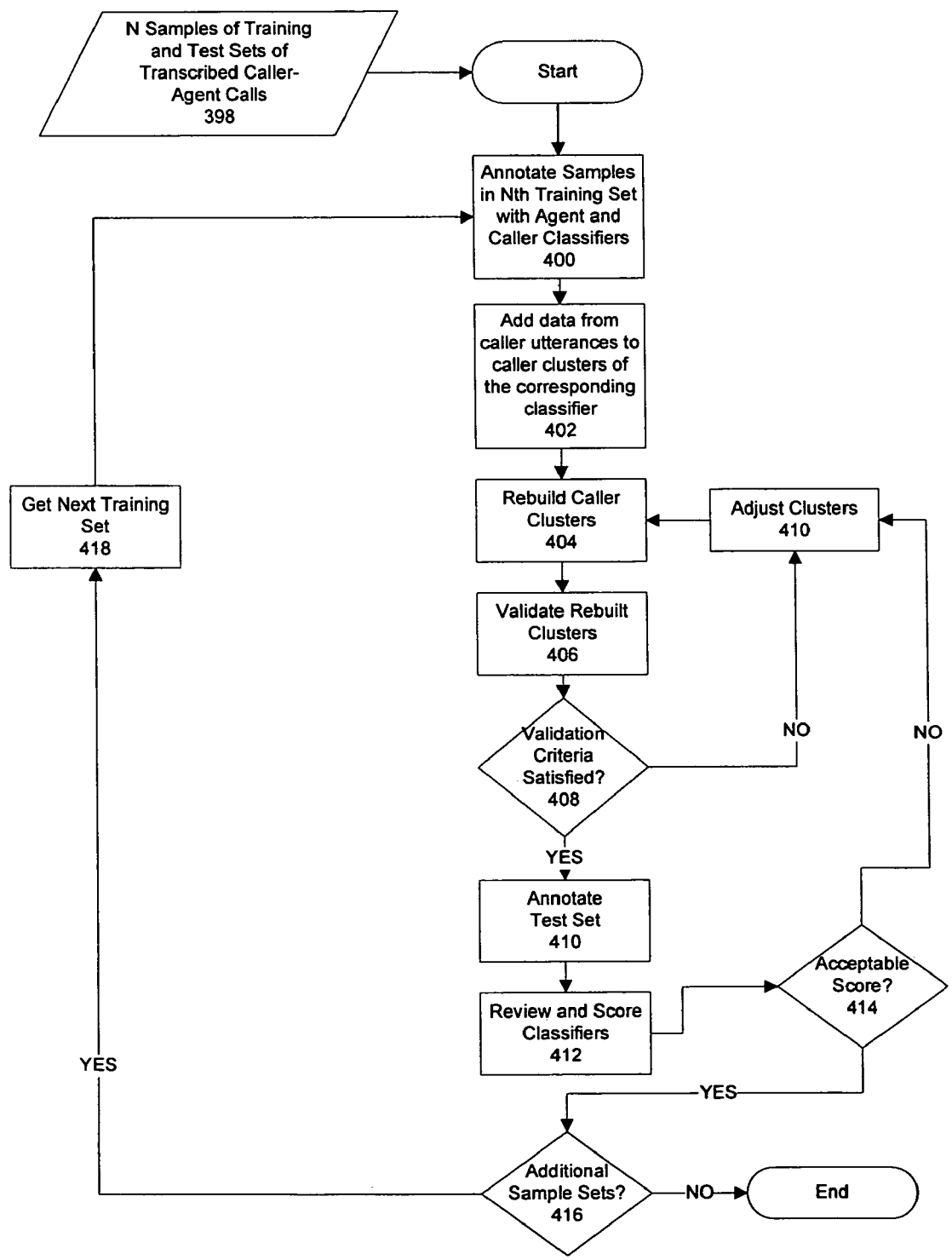

Referring to FIG. 16E, a process for augmenting the preliminary caller classifiers is illustrated. In this process, a number (N) of random samples of training and test sets of transcribed human agent-caller calls are used to improve the performance of the classifiers.

A first training set of random samples (e.g., 1000 randomly selected samples) is annotated 400 with the "golden" agent classifiers and the preliminary caller classifiers using the software tool. The software tool then adds the data (i.e., the semantic features) of the caller utterances corresponding to agent's requests for information (either requests for the caller's reason for calling or agent's requests for other information) to caller clusters of the corresponding classifier. For example, if a caller utterance of "yeah, its 123-45-6789" is given in response to an agent's request for the caller's social security number, the semantic features of the caller utterance is added to the caller cluster corresponding to a response of a social security number.

Once all of the data from the caller utterances in the sample set are added to the corresponding clusters, the caller classifiers (both caller initial request and non-initial response classifiers) are rebuilt 404 using, for example, a support vector machine.

The rebuilt clusters are then validated 408 by feeding the training set of calls through the newly built classifiers and comparing the clusters in which the classifiers attributed the caller utterances of the training set to the clusters in which the caller utterances were classified prior to the generation of the caller classifiers. If the newly built classifiers do not classify the training set such that they do not meet some validation criteria (e.g., new classifiers must correctly classify a higher percentage of caller utterances than previous classifiers), then the application developer adjusts 410 the clusters and rebuilds the caller classifiers.

Once the validation criteria is satisfied, the test set of calls is re-annotated 410 with the caller classifiers and then reviewed and scored 412 by the application developer in order to improve the classifiers. (No adjustment of clusters occurs, as it is assumed that the new data will improved the classifiers). The process illustrated in FIG. 16E may continue until the scores of the new classifiers approach an asymptote at which point a final set of agent and caller classifiers is established.

Figure 16F:
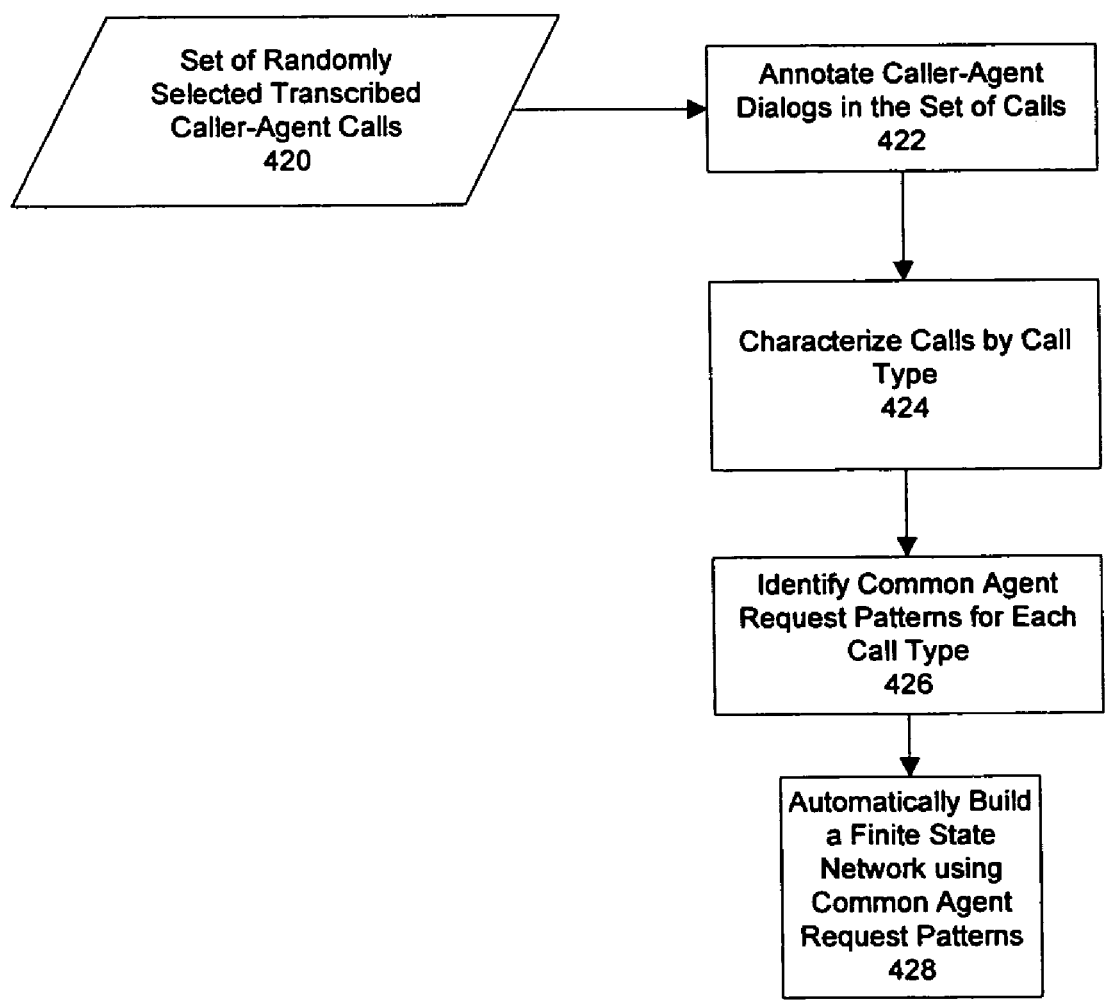

The final set of agent and caller classifiers can be used to identify canonical agent conversation patterns, which an application developer may use to develop a finite state network for the system. For example, as shown in FIG. 16F, a set of randomly selected agent-caller samples 420 is annotated 422 with classifier tags using the final agent and caller classifiers. The calls are then characterized 424 by call type. This step may be performed manually by an application developer reviewing the annotated agent-caller samples or may be performing automatically by a software process that optimizes the network path(s) associated which each caller's initial request.

A software process then can identify 426 common agent request patterns for each call type by comparing the sequence of agent requests for each call type. For example, if one call type is a request for account balance, the software process can examine each sequence of agent requests for responding to request for account balances to identify one or more common request patterns (e.g., a large number of agents made request "A" followed by request "B" followed by request "C"). The software process then uses the identified common request patterns (e.g. the most common request pattern for each call type) to automatically generate 428 a preliminary finite state network. An application developer would typically add nodes to the preliminary finite state network to, for example, allow for re-prompts to responses not understood by the system or to ask the caller to wait while the system looks up information, etc.

In addition to using common agent request patterns to generate a preliminary finite state network, an application developer can also use the common agent request patterns to identify call types. For example, once a set of common agent request patterns for different call types are identified, the agent classifiers can be applied to an unanalyzed set caller-agent of conversations to identify agent request patterns in the unanalyzed set. If a agent request pattern in a caller-agent conversation in the unanalyzed set matches one of the common request patterns for a known call type, the application developer (or software tool used by the application developer) can assume that that the caller-agent conversation is of the call type corresponding to the common caller-agent request pattern. The call type of a caller-agent conversation can be determined based on the on the set of agent classifiers present in a conversation, independent of any particular ordering of the classifiers. Alternatively, the call type can be determined based on a sequence of agent classifiers present in a conversation.

The pairs of classified agent and caller utterances in transcribed conversations can be used to identify successful agent requests for information. The distribution of caller responses to differently worded agent questions that were intended to elicit the same information (and hence were in the same cluster) can reveal that one way of asking for the information is more effective than other ways. For example, a first agent request phrased "May I have your social security number?" may have a significant number of caller responses of "yes" without providing the caller's social security number However, another agent classifier that classifies an agent request phrased "What is your social security number?" may yield a distribution in which a very high percentage of the caller responses to the question provided the requested information (i.e., the caller's social security number). By identifying which caller response types are responsive and which are non-responsive, it is then possible to look at the associated caller utterances and determine whether wordings of those agent utterances was responsible for the responsiveness of the caller's utterances.

Referring again to FIG. 12, once the initial CML application description 184 has been developed (e.g., using the initial development process illustrated in FIGS. 16A-16F), it is deployed 186 to a conversation server (e.g., conversation server 30 shown in FIGS. 5-6). The conversation server preferably supports "hot-deployment" of CML applications, which means that new versions of the CML application description may be re-deployed when it is already running on the conversation server. Hot-deployment preferably ensures that: (i) the already active application sessions will be allowed to run to completion; (ii) all resources employed by a version of an application (e.g., prompt files, etc.) will not be removed or replaced until no longer required; (iii) all new application sessions will make use of the newest version of the application; and (iv) all obsolete versions of the application, and supporting resources, will be removed from the conversation server when no longer needed by active application sessions.

After a CML application description has been deployed on a conversation server and begins handling calls, the conversation server records all of the system-caller dialogs in a media repository 187 and produces a log of the dialogs in a conversation log 188.

The media repository 187 includes the raw data from the system-caller conversations (e.g., audio files of a recorded caller-system telephone conversation, text files of a caller-system instant messaging conversation). An audio recording subsystem (not shown) records all customer calls from the time of origination (when the system begins handling the call) through the call's termination. For agent takeover calls, the audio subsystem continues recording the agent/customer interaction to its conclusion. In a preferred implementation, the audio recording subsystem records everything a caller said in a conversation in one audio file and everything the agent(s) (software and/or human agent) said in a separate file. In addition, the audio recording subsystem preferably eliminates silences in the recorded conversation.

The conversation log 188 is generated by the logging subsystem 64 (shown in FIG. 5). The logging subsystem generates the conversation log 64 by creating a session object for every call that is processed by the conversation server. The session object includes the following data:

The application being run (there may be multiple conversational applications in use on a conversation server)

A label indicating how the interaction was processed by the system (e.g., automated, blended, or agent takeover conversation)

A channel indicator (telephone, Web, chat/IM, email)

A links to associated audio file stored in the audio repository.

A representation of the entire conversation in chronological order that includes:

(i) the customer input recognized by the speech engine (recognized input);

(ii) for fully automated interactions (i.e., interactions which were completely handled by the software agents), the representation also includes:

the answers given to each question and their match scores if the interaction (iii) for blended interactions (i.e., interactions in which a human agent selected an answer from a list of answers presented by the system), the representation also includes:
   the top suggested answer(s) and related match scores;
   the answer selected by the agent and its match score and ranking among the list of suggested answers
(iv) for take over interactions, the representation also includes:
   the audio dialog between human agent and customer.
Timestamps indicating the time of call origination, time the call was escalated to a human agent (if applicable), and call completion time.
The sequence of states that the conversations that the agent and caller traverse and the events that caused the state transitions; e.g., human agent selecting a particular response or software agent selecting a response.
Identity of a human agent who assisted a call or took over a call (if applicable).
A record of all requests to back-end systems (e.g., systems containing information responsive to caller requests) and the results of those requests. For example, if the application needs to retrieve a customer's account balance, that requires a call to the back-end system.

The media repository 187 and conversation log 188 are available to the run-time learning process 190 to facilitate adjustments to the CML application.

The run-time learning process 190 uses an adaptive learning loop in which a history of the execution of the system (captured in the correspondence log 188 and media repository 187) is used to evolve the CML application to improve the system's ability to automate conversation. More particularly, the run-time learning process selects certain agent-caller interactions from the history of agent-caller conversations that are determined to be "good" learning opportunities for the system. The selected agent-caller interactions need not be the entire agent-caller conversation, but may be only a portion of an agent-caller conversation. The following are examples of caller-agent interactions that may be selected by a run-time learning process for improving the system:

1. In a conversation in which a human agent selected a response from a ranked list of responses to a caller utterance generated by the system, the meaning of the caller utterance can be discerned by the system from the response selected by the human agent. Accordingly, the caller utterance can be selected as a learning opportunity to improve the classifiers used by the system. Thus, if a caller makes an similar utterance in the future, the system is more likely to be able to respond without assistance from a human agent. Also, the recognized speech of the caller utterance (which can be recognized by a on-line ASR, an off-line ASR or by manual transcription) can be used to improve the language models used by the on-line ASR. Thus, if a caller makes an utterance using similar speech in the future, the on-line ASR will be more likely to accurately recognize the speech. 2. In a conversation in which the system gave an automated response to a caller utterance, the caller utterance preceding the automated response can be selected as a learning opportunity by the system to reinforce the behavior of the system. In this case, the recognized speech of the caller utterance (which can be recognized by a on-line ASR, an off-line ASR or by manual transcription) can be used to improve the language models used by the on-line ASR and/or improve the classifiers used to discern the meaning of caller utterances.

3. In a conversation in which a human agent took over the conversation, the human agent-caller interactions can be selected as learning opportunities. In this case, a system administrator may analyze the human agent-caller exchange for conversations that were not anticipated by the system (and thus not part of the system's finite state network). The system administrator can use the human agent-caller exchange to add nodes to the system's finite state network and build classifiers so that if a caller contacts the call center in the future, the system is prepared to handle the call. For example, if a printing error led to mailing of blank bills to customers in a particular month, the system may receive a number of caller inquiries about the blank bill. This is likely a conversation that has not been anticipated by the system. After receiving some of these inquiries, the system administrator may build a set of classifiers and update the finite state network (e.g., using the process described in FIG. 15 above) so that the system can handle similar calls in the future.

The run-time learning process feeds selected agent-caller interactions to the conversation studio 32 (shown in FIGS. 4-5), where they are used to rebuild classifiers, improve the language models used for run-time speech recognition, and/or modify the state transition network.

In one implementation, a run-time learning process scans system-caller conversations for the following learning opportunities:

1. Assists—in conversations where a human agent informed the software agent of the proper interpretations of a caller statement when the software agent was uncertain, the agent's interpretation of the caller's statement is used to improve the classifiers used by the concept recognition engine to understand caller speech. Other implementations use the agent's interpretation of the caller's statement to improve the language models used by the on-line ASR.

2. Take-Overs—in conversations in which a human agent took over the conversations from a software agent, the human agent-caller exchange is analyzed by a system administrator to identify new conversations. If a new conversation is identified, a new set of caller classifiers and updated finite state network can be developed (e.g., using the process described in FIG. 15 above) to add that new conversation to the application.

3. Reinforcements—in conversations where a software agent successfully recognized one or more caller utterance, the caller utterance(s) are used to improve the language models used by the on-line ASR (which is a component of the speech recognition engine) to recognize the caller speech. Other implementations, use these conversations to improve the classifiers used by the concept recognition engine to understand the meaning of caller speech.

When the run-time learning process 190 uses an agent-caller interaction as a learning opportunity, there is the risk that the interaction of the learning opportunity is not correct. Processing "bad" interactions (e.g., interactions in which the system misinterpreted a caller's question and gave an incorrect response) present a danger of degrading the accuracy and degree of automation of the system. Accordingly, a run-time learning process preferably includes one or more safeguards that help ensure that it only selects "good" interactions from which to learn.

In a preferred embodiment, the run-time learning process is configurable by a system administrator or other user through a graphical user interface at the conversation studio 32 (shown in FIGS. 4-5) to require that selected interactions satisfy certain selection criteria. In one implementation, a system administrator can select one or more of the following selection criteria for choosing learning opportunities:

1. Select agent-caller interactions as a reinforcement learning opportunity if n (e.g., n=2, 3, 4, etc.) subsequent agent-caller interactions were successful (e.g., interactions that did not result in the caller hanging up or asking for help or to speak to a human agent).

2. Select agent-caller interactions as reinforcement and/or assist learning opportunities only if the caller responded positively to a satisfaction question posed by the software agent or human agent (e.g., "Did that answer your question?", "Are you satisfied with the service you received?").

3. Select agent-caller interactions as reinforcement and/or assist learning opportunities that are confirmed by m (e.g., m=2, 3, 4, etc.) of other examples. This avoids the system from extrapolating from a limited number of examples.

4. Select agent assist interactions as learning opportunities if they are confirmed by some number of different agents.

5. Select agent assist interactions if the assist is performed by a "trusted" agent. A trusted agent can be determined according to some "trust" measure, such as the length of the person's tenure as an agent or a cumulative score on previous assist learning examples attributed to the agent.

6. Select agent assist interactions as learning opportunities only if they are among the top n choices (e.g., n=1, 2, 3, etc.) proposed by the system.

7. Avoid selecting interactions as learning opportunities if adding new examples to a cluster would shift a predetermined number of previous examples from the cluster. For example, suppose an existing cluster contains 100 example utterances that all mean "I want my account balance" and a new caller utterance from a selected interaction is added to the cluster and a new set of classifiers is regenerated using the new training set of 101 utterances (the original 100 plus the new one). The 101 utterances can be applied to the new set classifiers to see how the new set of classifiers classified them. Ideally the new classifiers should classify them all as belonging to the "I want my account balance" cluster since that's how the classifiers was trained. However, if it is discovered that a certain number (e.g., 1, 2, 3, etc.) of the original utterances are now misclassified as belonging to some other cluster, or are now ambiguously classified, then this is an indication that the new learned utterance has degraded the accuracy of the classifiers and should not have been added to this cluster in the first place. This selection criteria could be combined with selection criteria 3 above to require stronger evidence to add a new example to a cluster that causes a predetermined number of previous examples to be eliminated.

In addition to the risk of system degradation from learning from "bad" examples, it can also be advantageous to limit learning opportunities in order to conserve processing and/or human administrative resources. For example, the average North American call center handles approximately 3 million calls a year, and, assuming 10 caller-agent exchanges per call, this means that an average call center generates 120,000 potential learning events per day. Many organizations will not (or legally can not) allow the system to change its behavior without the approval of some responsible human. Even in those cases where automatic system evolution is desired, the shear volume of examples may eventually become a burden on processing resources. Thus, it can be advantageous for the run-time learning process to ensure that only relevant or useful examples are processed and/or presented for human review. In a preferred embodiment, the run-time learning process is configurable by a system administrator or other user through a graphical user interface at the conversation studio 32 (shown in FIGS. 4-5) to require that selected interactions satisfy one or more selection criteria to help avoid system and/or user overload:

1. Do not select an interaction that does not classify at least n (e.g., n=1, 2, 3, etc.) other interactions because an interaction that accounts for its own understanding is typically not very useful.

2. Rank interactions by the number of other interactions that they classify. Add only the top n=1,2,3 . . . of these most productive examples as learning opportunities.

3. Do not add an interaction that does not change the definitive set by at least some threshold. As explained above, the classifiers are created from a training set of examples. Some examples in the training set matter and some don't. That is, if one were to eliminate the examples that don't matter and recreate the classifier, you get the same classifier as before. The examples that do matter are called the definitive set (known software processes used to determine the definitive set of a SVM classifier). This selection criteria means that if an interaction is added to the training set for the classifier via learning process and a new classifier is build using the new training set, but the definitive set of the classifier does not change by some threshold (e.g., most of its members are the same as before), then the classifier hasn't learned much from the additional interaction, and it can be disregarded (in which case the original classifiers would remain in place). Useful interactions for learning are those interactions that have a noticeable impact on the definitive set.

4. Limit the number or variety of examples the system retains by placing a numeric or age-related threshold on the examples in a cluster. One age-related threshold is the last time the example was used to classify some number of others. This may be especially important in the beginning when a system trained on human-human data is learning the different style humans may adopt when speaking to a machine.

While the above selection criteria apply to any form of system-caller communication (e.g., speech, instant messaging, etc.), special problems arise when the medium of interaction is speech or handwriting or any other modality where a significant chance of misrecognition may occur in the on-line ASR (or an on-line optical character recognition (OCR) system in the case of recognizing handwriting).

In some cases, the recognition of the caller's speech (or handwriting) that is captured in the conversation log may not be accurate enough to serve as a useful example. This is especially a problem in assist or takeover learning where the human agent supplies the correct interpretation when the system could not understand what the caller said or wrote. Learning from inaccurately recognized speech or handwriting could degrade the system performance or, at a minimum, waste system resources. The run-time learning system preferably guards against learning from inaccurately recognized data by requiring the agent selected answer to be among the set of top n (e.g., n=1,2,3 . . . ) of hypotheses presented by the system. The system can also require some internal confidence measure of the recognized data (produced by an on-line or off-line ASR) to exceed a threshold to avoid learning from misrecognized examples.

The threat of inaccurately recognized data in a conversation log is substantial because, when the system is operating, it typically faces a time constraint in that callers are not willing to wait more than a few seconds for a response. This limits the amount of processing that the on-line ASR can use to recognize and classify a user request. However, a run-time learning process can re-recognize the caller input for the purpose of learning without such a strict time constraint. This offline recognition can use different algorithms or models or parameters to achieve better results by using more resources and even make multiple passes of the same and/or related user input. For example, the entire caller conversation (all 10 turns) could be used as training to re-recognize each turn. The run-time learning process can be designed to use excess peak period capacity during off hours to perform this task. The run-time process could also use computing resources over a network (e.g., the Internet) to re-recognize caller input.

Recognizing caller input (e.g., speech) is a computationally intensive process, and, as such, a run-time learning process may not have processing resources available to process to re-recognize every user utterance. One way a run-time learning process can limit processing resources is to only select those system-caller interactions that have been selected as learning opportunities using the one or more of the selection criteria outline above. In addition to the above techniques, the process can use a confidence level of the interaction as a filter. High confidence interactions can be presumed to be correct, and low confidence interactions can be assumed to be so problematic as to be untrustworthy (too much external noise for example). Appropriate "high" and "low" thresholds can be computed by the system from training examples.

Moreover, recognition techniques often assume that they know the extent of the vocabulary of the system. A particular problem is when and how to expand the system's basic inventory of primitive units. A run-time learning process can use an offline recognition can use a different (usually larger) vocabulary to determine when to expand the vocabulary of the concept recognition system. If the larger vocabulary produces better internal and external scores, the run-time learning process can assume it to be a "better" vocabulary for the concept recognition engine. The run-time learning process can dynamically construct a new vocabulary from, e.g., news feeds so that it contains new items and combinations. Low-level confidence measure can identify regions of possibly new items. When similarity grouped new items exceed some threshold, a human can be asked for assistance in identifying the new items.

Finally, many recognition systems have separate models for different task levels. For example, a voice response system might have Gaussian acoustic models to classify phonetic level units, dictionaries to map phonetic sequences to words, statistical language models to rate word sequences, and SVM's to classify whole utterances into equivalent semantic groups. A run-time learning process can use the selected learning examples to train the models at various levels either independently or jointly in various combinations.

Figure 17:
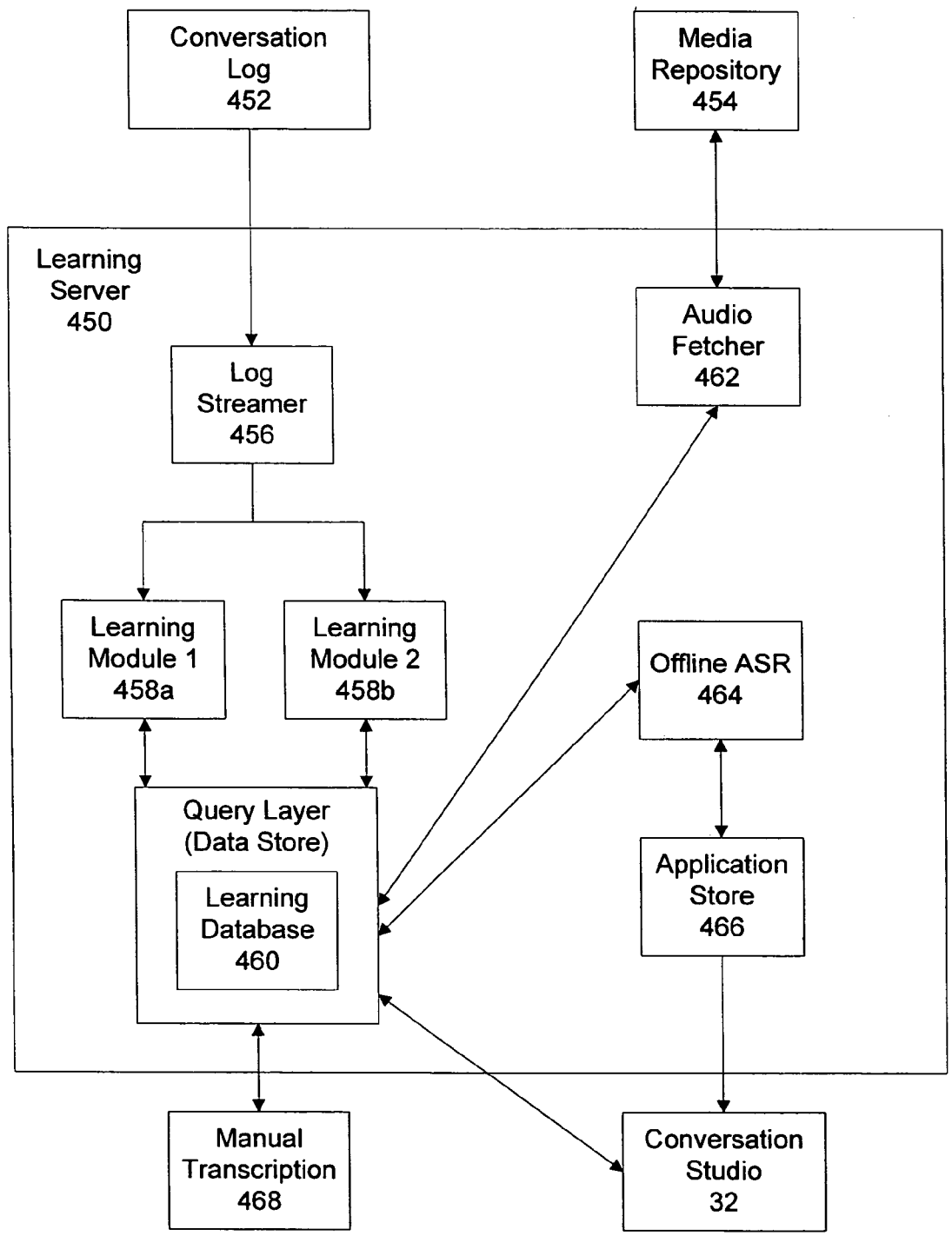
FIG. 17 is a block diagram of a learning server.

Referring to FIG. 17, a learning server 450 implements a run-time learning process. In this particular implementation, the learning server includes a log streamer 456, learning modules 458, a learning database 460, an audio fetcher 462, an offline automatic speech recognition application 464, and an application store 466.

In operation, logs of system-caller conversations are pushed to the log streamer 456 from the conversation log 452 as the logs are generated by the conversation server. The conversation server (e.g., conversation server 30 shown in FIGS. 4-5) or another mechanism (e.g., another server) can be configured to push the logs to the log streamer.

As the log streamer receives conversation logs, it routes the logs to one of the learning modules 458a, 458b for analysis. The learning modules are a modular approach to introducing learning capabilities to the learning server. For example, in one implementation, one learning module is dedicated to identifying learning opportunities from agent assists, a second learning module is dedicated to identifying reinforcement learning opportunities, and a third learning module is dedicated to identifying take-over learning opportunities. If there are new learning capabilities to be added to the server, a new learning module is developed and introduced into the learning server. So, for example, a vocabulary learning module could be added to the learning server to examine words used in caller utterances to expand the vocabulary of the system.

The learning modules also function to select events captured in the conversation logs and audio files as learning opportunities. The system learning modules selects events captured in the conversation logs/audio files according to the selection criteria (discussed above) that are specified by a system administrator. For some selection criteria, such as selecting a system-user interaction for learning if a certain number of subsequent system-caller interactions were successful, can be determined from the conversation log corresponding to the candidate system-caller interaction. However, other selection criteria require the learning modules to examine multiple conversation logs to determine if a system-caller interaction should be selected. For example, if a selection criteria specifies that an agent-caller interaction should not be selected unless if it confirmed by a certain number of other examples, the learning module will do multiple passes on the agent-caller interactions. In a first pass, the learning module identifies and saves agent-caller interactions as possible learning opportunities. After a certain amount of candidate interactions are saved or after a certain amount of time, the learning module analyzes the saved candidate interactions to choose the interactions to ultimately select as learning opportunities.

As the learning modules selects system-caller interactions as learning opportunities, the selected system-caller interaction is stored in the learning database 460.

In addition to the selection criteria for filtering the system-caller interactions, the learning modules are also configured to examine the match scores level reported by the concept recognition engine (which is included in the conversation logs) to determine whether to send the selected system-caller interaction for off-line ASR 464 or manual transcription 468. A threshold range of match scores may be configurable by a user (e.g., the system administrator) or it may be preprogrammed. The threshold range of match scores preferably excludes scores of very low confidence (indicating that the utterance is too problematic to be trustworthy) and scores of very high confidence (indicating that the original recognition is correct). If the transcription is directed to the Offline ASR 464, the Offline ASR process 464 accesses the application definition within the Application Store 466 to retrieve the ASR language model used for the particular recognition state (each recognition state uses a separate language model). The learning modules are configured to route all agent-take over interactions to the offline ASR or manual transcription since the concept recognition engine does not recognize caller or agent utterances during an agent take over. In some configurations, the learning modules are configured to route agent take-overs for manual transcription as opposed to automated transcription by the offline ASR to obtain a high quality transcription of the caller-human agent interaction.

Finally, an application developer uses a graphical user interface on the conversation studio 32 to retrieve the learning opportunities that are ready for consideration. The application developer optionally approves the learning opportunities (e.g., via a graphical user interface) and updates the application with the approved learning opportunities. Once the application has been updated, the new version is placed in the application store 466 and deployed to conversation server.

The assist learning opportunities yield new caller utterances that are added to the appropriate conceptual clusters, which are then used to regenerate the classifier used for concept recognition. The updated application will then be able to classify similar utterances properly the next time they are spoken by callers. Reinforcement learning opportunities yield new utterances that are added to the language models used for speech recognition to improve accuracy of the on-line ASR. Takeover learning opportunities extends the finite state network to handle new topics and new interactions around existing topics.

Figure 13:
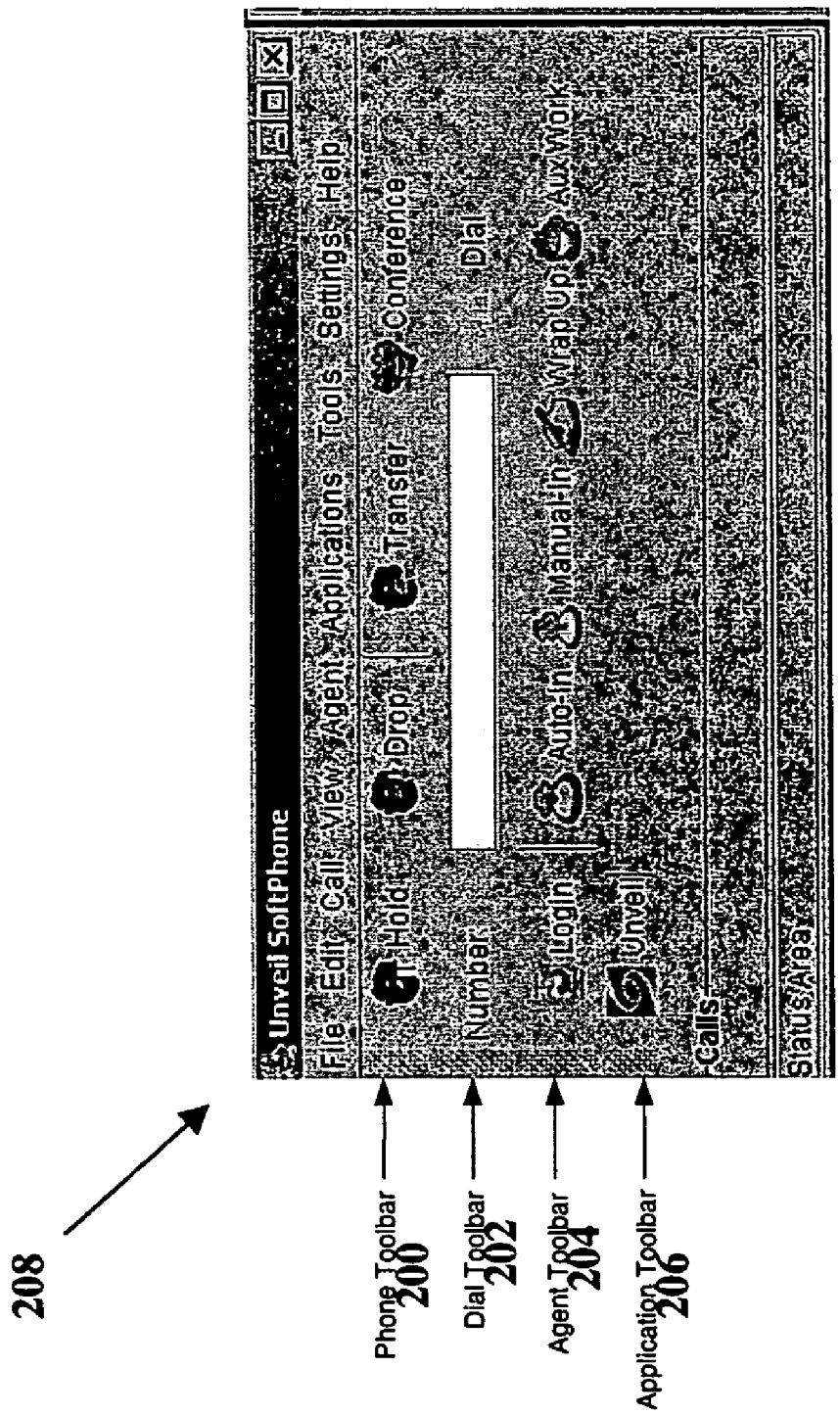
FIG. 13 is a screen shot.

FIG. 13 depicts the graphical user interface 208 which is a component of the generic agent desktop that allows an human agent to log into workgroups, manage his work state, and receive and place calls; all through interactions with the CTI server. The user interface 208 is the control panel through which the agent launches applications that employ the CTI server including the desktop application.

The interface 208 is modeled on the Avaya IP Agent desktop. The most common functions of the desktop are exposed via toolbars. The toolbars shown in FIG. 13 are: Phone 200 (provides control over the selected call), Dial 202 (provides a means of placing a call), Agent 204 (provides means of setting the agent's work state with respect to the ACD), and Application 206 (provides a means of launching applications that have been loaded into the interface 208).

Upon a human agent's login, a configuration for the desktop is loaded from the server. Part of this configuration is a definition of the applications that may be launched from the desktop. The application configuration includes the classes that implement the application and the net location from which to load the application. In addition, the configuration will include the application data that indicates that a call is targeted at the application.

Figure 14:
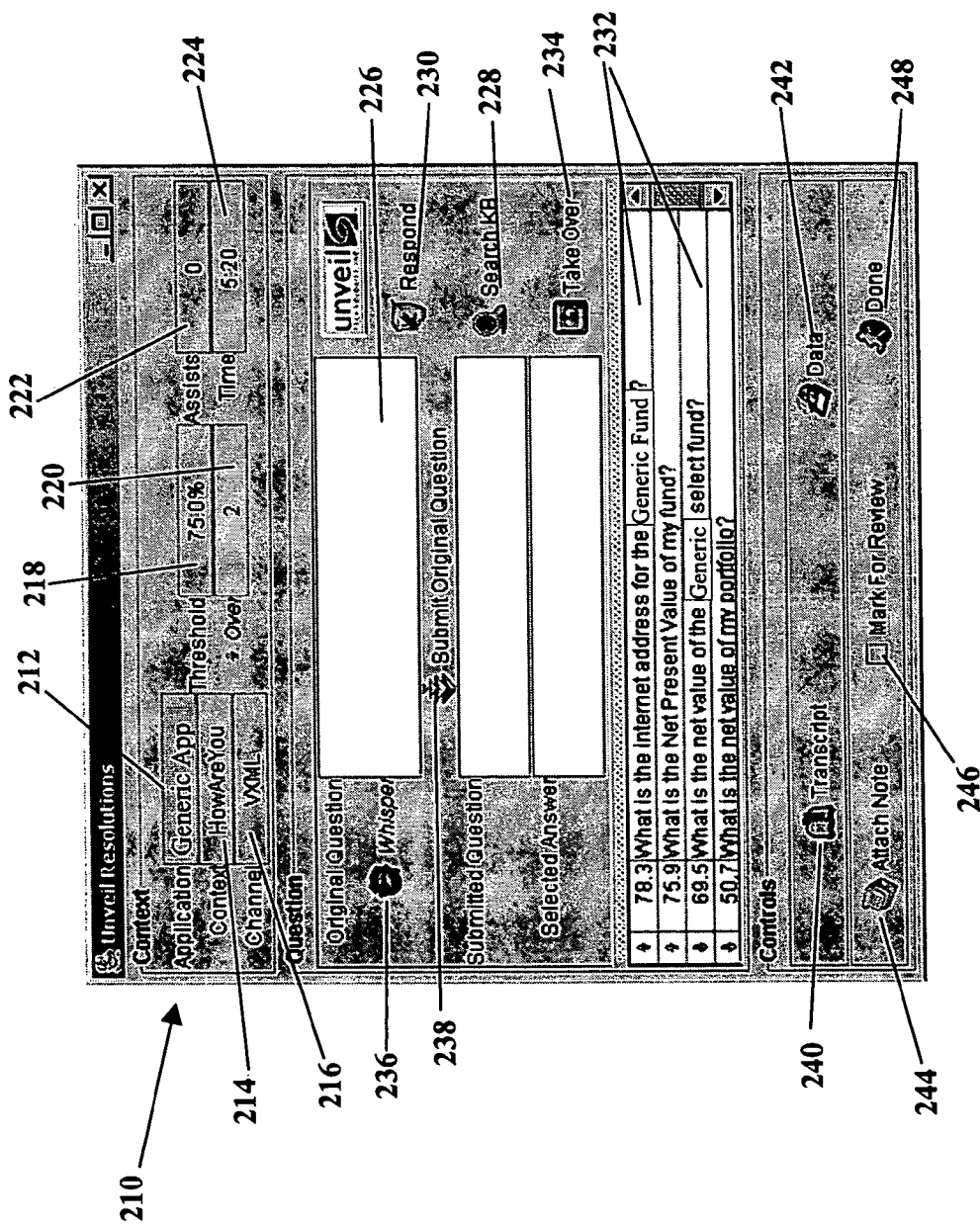
FIG. 14 is another screen shot.

FIG. 14 depicts the resolution application or graphical user interface 210. This application is triggered every time a call arrives with application data indicating that the call is a resolution call. The application user interface is broken into three main sections. The presented information is as follows: Application 212 (The CML application being run), Context 214 (The current state within the application), Channel 216 (The channel through which the customer has contacted the center), Threshold 218 (The threshold setting for the context), Over/Under 220 (The reason why the resolution has been presented to the agent; i.e., either there are too many answers over the threshold or not enough answers over the threshold), Assists 222 (The number of times the customer has been assisted in this session), and Time 224 (The length of time that the customer has been in this session).

Within the question resolution panel 226, the human agent is able to select a proper answer to the customer's question. The actions that the agent can perform in this panel are: Search KB 228 (to modify a query and search the knowledge base for answers), Respond 230 (To instruct the software agent as to respond to the customer with the selected answer. Answers 232 matching a query are displayed in the table at the bottom of the panel. Each answer 232 indicates whether it is over or under the context confidence threshold, its match ranking, and a summary of its question.), Take Over 234 (To take over a call from the software agent), Whisper 236 (To hear the recording of the customer's request), and Submit Original Question 238 (To submit the customer's original question as a query to the knowledge base. This is the initial action performed by the application.).

The graphical user interface 210 also enables a human agent to enter in substitute text for the customer's communication in the box titled "Substitute Question". If the confidence levels of the computer generated responses are low, the human agent may decide to rephrase the customer's communication in such a manner that the human agent knows that the system will match it better.

There are two sets of controls at the bottom of the user interface: transcript and data. Transcript button 240 launches a web page that shows the transcript of the software agent's dialog with the customer in a chat style transcript. This web page is generated from the software agent's running transcript of the conversation through the same Cocoon infrastructure used in the interaction channels. Data button 242 launches a web page that shows the application data that has been collected to date by the software agent. This web page is generated from the software agent's application and network properties through the same cocoon infrastructure used in the interaction channels. As with the interaction channels, it is possible to define the presentation of this data at an application level, network level, and/or context level with the definition at the more specific level overriding the definition at more general level; e.g., a definition at the context level will override the definition at the network or application level.

The Wrap-Up Controls allow a human agent to provide guidance that is placed in the conversation log. Attach Note button 244 allows the human agent to attach a note to this interaction in the conversation log. Mark for Review checkbox 246 is used to indicate that this interaction should be marked for review in the conversation log. Done button 248 indicates that the agent is done with this resolution. The system proactively indexes, categorizes and monitors archived voice and text-based conversations for quality assurance, dispute resolution and market research purposes. Because it is completely automated, the system can proactively monitor call archives for deviations in customer call patterns, alerting supervisors through regular reporting mechanisms.

For instance, in the category of conversation mining, the system transcribes customer audio for later data mining (e.g., quality control for financial services). This involves taking transcribed conversations from batch recognition process, CRE utilized to cluster logs, and provides the ability to search within clusters for specific topics (i.e. promotions, problem areas etc.). The system may also cluster call by specific topic (sub-cluster), locate and mark deviations in call patterns within sub-clusters, and enable administrator to access specific point within audio stream where deviation occurs. This functionality provides an audit trail for what agent says. For example, a cluster about product returns might indicate that different agents direct customers to return products to different locations. To do this, clusters retain data associated with log before multi-pass ASR. For another example, clusters might show that some agents associate existing answer in knowledgebase with a customer question (blended workflow), while other agents pick up the call (takeover workflow) and provide their own response.

Although certain implementations of the invention have been described, including a particular application to contact center management, a wide variety of other implementations are within the scope of the following claims.

What is claimed is:

1. A computer-implemented method comprising:
   receiving a set of conversations between a member of a first party type and a member of a second party type, wherein each of the conversations includes a communication of a member of the first party type and a communication of a member of the second party type that is responsive to the communication of the member of the first party type;
   grouping the communications of members of the first party type into a first set of clusters;

grouping the responsive communications of members of the second party type into a second set of clusters based upon the grouping of the communications of members of the first party type; and by machine, generating a set of agent type classifiers for one or more clusters in the second set of clusters, wherein generating is a step executed by a computer processor that is a functional component of the computer, said execution being part of execution, by the computer processor, of computer-readable instructions embedded on a computer-readable storage medium.

2. The method of claim 1 wherein the communications comprise utterances.

3. The method of claim 1 wherein the communications comprise text messages.

4. The method of claim 1 wherein the communications of members of the first party type comprise communications of human customer service agents at a call center.

5. The method of claim 1 wherein the communications of members of the first party type comprises communications of software agents configured to communicate with humans who contact a call center.

6. The method of claim 1 wherein the communications of members of the second party comprise communications of humans who have contacted a call center.

7. The method of claim 1 wherein the classifiers comprise support vector machines.

8. The method of claim 1 wherein the classifiers comprise decision trees.

9. The method of claim 1 wherein communications of members of a first party type are grouped into a first set of clusters using a computer.

10. The method of claim 9 wherein grouping communications of members of a first party type into a first set of clusters comprises determining semantic features of the communications.

11. The method of claim 1 wherein grouping communications of members of the first party type into a first set of clusters is based on a meaning of the communications of members of the first party type.

12. The method of claim 1 further comprising:

by machine, generating a set of agent type classifiers for one or more clusters in the first set of clusters.

13. The method of claim 1 wherein grouping communications of members of the first party type into a first set of clusters comprises:

grouping communications corresponding to requests for information from members of the first party type into a first set of clusters.

14. The method of claim 13 wherein grouping responsive communications of members of the second party type into a second set of clusters based upon the grouping of the communications of members of the first party type comprises:

grouping communications of members of the second party type into groups corresponding to responses to the requests for information from members of the first party type.

15. The method of claim 12 wherein grouping responsive communications of members of the second party type into a second set of clusters based upon the grouping of the communications of members of the first party type comprises:

using the first agent type classifiers to classify a communication of a member of the first party type into a cluster of the first party type;

grouping a communication of a member of the second party type that is subsequent to the classified communication of the member of the first party type into a cluster of the second party type that relates to the cluster of the first party type.

16. The method of claim 15 wherein the cluster of the first party type relates to a request for information made by a member of the first party type and the cluster of the second party type relates to a response to the request for information given by a member of the second party type.

17. The method of claim 1 further comprising:

receiving a second set of conversations between members of the first party type and members of the second party type, wherein each of the conversations includes a communication of a member of the first party type and a communication of a member of the second party type that is responsive to the communication of the member of the first party type;

applying classifiers to group the communications of members of the second party type;

by machine, regenerating agent type classifiers for a cluster in the second set of clusters using data relating to the communications grouped in the clusters.

* * * * *